US008990691B2

(12) United States Patent
Matas et al.

(10) Patent No.: US 8,990,691 B2
(45) Date of Patent: Mar. 24, 2015

(54) VIDEO OBJECT BEHAVIOR IN A USER INTERFACE

(75) Inventors: Michael Matas, San Francisco, CA (US); Kimon Tsinteris, San Francisco, CA (US); Austin Sarner, San Francisco, CA (US); Charles Melcher, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 134 days.

(21) Appl. No.: 13/490,343

(22) Filed: Jun. 6, 2012
(Under 37 CFR 1.47)

(65) Prior Publication Data

US 2013/0198634 A1    Aug. 1, 2013

Related U.S. Application Data

(60) Provisional application No. 61/593,841, filed on Feb. 1, 2012.

(51) Int. Cl.
| | |
|---|---|
| *G06F 3/00* | (2006.01) |
| *G06F 3/0481* | (2013.01) |
| *G06T 15/60* | (2006.01) |
| *G06T 11/60* | (2006.01) |
| *H04L 29/08* | (2006.01) |
| *G06F 3/0484* | (2013.01) |
| *G06F 3/01* | (2006.01) |
| *G06F 3/0485* | (2013.01) |

(52) U.S. Cl.
CPC ............ *G06F 3/04815* (2013.01); *G06T 15/60* (2013.01); *G06T 11/60* (2013.01); *H04L 67/06* (2013.01); *G06F 3/0484* (2013.01); *G06F 3/0481* (2013.01); *G06F 3/017* (2013.01); *G06F 3/0485* (2013.01)

USPC .......................................................... 715/717

(58) Field of Classification Search
None
See application file for complete search history.

(56) References Cited

U.S. PATENT DOCUMENTS

| | | |
|---|---|---|
| 5,727,129 A | 3/1998 | Barrett |
| 6,934,740 B1 | 8/2005 | Lawande |
| 6,948,125 B2 | 9/2005 | Detweiler |
| 6,971,957 B2 | 12/2005 | Osako |
| 7,320,113 B2 | 1/2008 | Roberts |
| 7,439,975 B2 | 10/2008 | Hsu |
| 7,663,620 B2 | 2/2010 | Robertson |
| 7,663,623 B2 | 2/2010 | Zhou |
| 7,667,719 B2 | 2/2010 | Goodwin |
| 7,675,518 B1 | 3/2010 | Miller |

(Continued)

OTHER PUBLICATIONS

U.S. Appl. No. 13/487,765, filed Jun. 4, 2012, Matas.

(Continued)

*Primary Examiner* — Matt Kim
*Assistant Examiner* — Maryam Ipakchi
(74) *Attorney, Agent, or Firm* — Baker Botts L.L.P.

(57) ABSTRACT

In one embodiment, presenting a video in a user interface in a first presentation mode of a plurality of presentation modes, each presentation mode has a specific size for presenting a visual portion of the video and a specific volume for presenting an audio portion of the video; and in response to a user interaction with the video in the first presentation mode, transitioning the video to a second presentation mode, comprising: changing the visual portion of the video from a first size of the first presentation mode to a second size of the second presentation mode; and changing the audio portion of the video from a first volume of the first presentation mode to a second volume of the second presentation mode.

17 Claims, 23 Drawing Sheets

(56) References Cited

U.S. PATENT DOCUMENTS

| | | | |
|---|---|---|---|
| 7,743,322 B2 | 6/2010 | Atkins | |
| 7,769,794 B2 | 8/2010 | Moore | |
| 7,817,823 B1 | 10/2010 | O'Donnell | |
| 7,916,157 B1 | 3/2011 | Kelley | |
| 7,996,788 B2 | 8/2011 | Carmichael | |
| 8,006,195 B1 | 8/2011 | Woodings | |
| 8,131,898 B2 | 3/2012 | Shah | |
| 8,365,091 B2 | 1/2013 | Young | |
| 8,458,614 B1 | 6/2013 | Smith | |
| 8,473,868 B1 | 6/2013 | Kauffman | |
| 8,516,385 B1 | 8/2013 | Eismann | |
| 8,533,190 B2 | 9/2013 | Walker | |
| 8,539,344 B2* | 9/2013 | Hull et al. | 715/255 |
| 8,539,384 B2 | 9/2013 | Hinckley | |
| 8,584,027 B2 | 11/2013 | Quennesson | |
| 8,635,531 B2* | 1/2014 | Graham et al. | 715/716 |
| 8,639,694 B1 | 1/2014 | Wolfe | |
| 8,656,312 B2 | 2/2014 | Kagaya | |
| 8,669,950 B2* | 3/2014 | Forstall et al. | 345/173 |
| 8,736,561 B2* | 5/2014 | Anzures et al. | 345/173 |
| 8,799,658 B1 | 8/2014 | Seller | |
| 8,856,678 B1 | 10/2014 | Cho | |
| 2001/0030667 A1 | 10/2001 | Kelts | |
| 2001/0033303 A1 | 10/2001 | Anderson | |
| 2002/0070982 A1* | 6/2002 | Hill et al. | 345/835 |
| 2002/0107892 A1 | 8/2002 | Chittu | |
| 2003/0046401 A1* | 3/2003 | Abbott et al. | 709/228 |
| 2003/0090504 A1* | 5/2003 | Brook et al. | 345/716 |
| 2004/0001106 A1 | 1/2004 | Deutscher | |
| 2004/0095376 A1* | 5/2004 | Graham et al. | 345/716 |
| 2004/0145603 A1 | 7/2004 | Soares | |
| 2005/0005246 A1 | 1/2005 | Card | |
| 2005/0010955 A1* | 1/2005 | Elia et al. | 725/88 |
| 2005/0055426 A1 | 3/2005 | Smith | |
| 2005/0071783 A1 | 3/2005 | Atkins | |
| 2005/0210403 A1 | 9/2005 | Satanek | |
| 2005/0262149 A1 | 11/2005 | Jung | |
| 2006/0059425 A1 | 3/2006 | Anspach | |
| 2006/0174209 A1 | 8/2006 | Barros | |
| 2006/0230354 A1 | 10/2006 | Jennings | |
| 2006/0253777 A1 | 11/2006 | Yalovsky | |
| 2007/0088681 A1 | 4/2007 | Aravamudan | |
| 2007/0115300 A1 | 5/2007 | Barney | |
| 2007/0150826 A1 | 6/2007 | Anzures | |
| 2007/0226640 A1 | 9/2007 | Holbrook | |
| 2007/0258642 A1 | 11/2007 | Thota | |
| 2007/0271516 A1 | 11/2007 | Carmichael | |
| 2008/0025529 A1* | 1/2008 | Keohane et al. | 381/104 |
| 2008/0052742 A1 | 2/2008 | Kopf | |
| 2008/0065675 A1 | 3/2008 | Bozich | |
| 2008/0079972 A1 | 4/2008 | Goodwin | |
| 2008/0082927 A1 | 4/2008 | Kelts | |
| 2008/0168404 A1 | 7/2008 | Ording | |
| 2008/0174570 A1 | 7/2008 | Jobs | |
| 2008/0222540 A1 | 9/2008 | Schulz | |
| 2009/0007017 A1 | 1/2009 | Anzures | |
| 2009/0061837 A1* | 3/2009 | Chaudhri et al. | 455/418 |
| 2009/0070710 A1 | 3/2009 | Kagaya | |
| 2009/0132921 A1 | 5/2009 | Hwangbo | |
| 2009/0172532 A1 | 7/2009 | Chaudhri | |
| 2009/0172543 A1 | 7/2009 | Cronin | |
| 2009/0201270 A1 | 8/2009 | Pikkujamsa | |
| 2009/0204928 A1 | 8/2009 | Kallio | |
| 2009/0228782 A1 | 9/2009 | Fraser | |
| 2009/0228832 A1 | 9/2009 | Cheng | |
| 2009/0249238 A1 | 10/2009 | Eilers | |
| 2009/0271703 A1 | 10/2009 | Chu | |
| 2009/0288032 A1 | 11/2009 | Chang | |
| 2009/0300548 A1 | 12/2009 | Sullivan | |
| 2009/0309846 A1 | 12/2009 | Trachtenberg | |
| 2010/0060666 A1 | 3/2010 | Fong | |
| 2010/0097338 A1 | 4/2010 | Miyashita | |
| 2010/0114991 A1 | 5/2010 | Chaudhary | |
| 2010/0119180 A1 | 5/2010 | Brichter | |
| 2010/0122195 A1 | 5/2010 | Hwang | |
| 2010/0277496 A1 | 11/2010 | Kawanishi | |
| 2010/0287494 A1 | 11/2010 | Ording | |
| 2010/0313125 A1 | 12/2010 | Fleizach | |
| 2011/0035703 A1* | 2/2011 | Negishi et al. | 715/802 |
| 2011/0063248 A1 | 3/2011 | Yoon | |
| 2011/0122078 A1 | 5/2011 | Kasahara | |
| 2011/0157051 A1 | 6/2011 | Shohga | |
| 2011/0163969 A1* | 7/2011 | Anzures et al. | 345/173 |
| 2011/0163971 A1 | 7/2011 | Wagner | |
| 2011/0167380 A1 | 7/2011 | Stallings | |
| 2011/0187655 A1 | 8/2011 | Min | |
| 2011/0202834 A1 | 8/2011 | Mandryk | |
| 2011/0209100 A1 | 8/2011 | Hinckley | |
| 2011/0246614 A1 | 10/2011 | Votaw | |
| 2011/0276863 A1 | 11/2011 | Bhise | |
| 2011/0302532 A1 | 12/2011 | Missig | |
| 2012/0047432 A1 | 2/2012 | Yalovsky | |
| 2012/0054684 A1 | 3/2012 | Gossweiler | |
| 2012/0070017 A1* | 3/2012 | Dorogusker et al. | 381/104 |
| 2012/0084662 A1* | 4/2012 | Navarro et al. | 715/740 |
| 2012/0131516 A1 | 5/2012 | Chiu | |
| 2012/0159393 A1 | 6/2012 | Sethi | |
| 2012/0227002 A1 | 9/2012 | Tiwarie | |
| 2012/0233573 A1 | 9/2012 | Sullivan | |
| 2012/0266068 A1 | 10/2012 | Ryman | |
| 2012/0272171 A1 | 10/2012 | Icho | |
| 2012/0272181 A1 | 10/2012 | Rogers | |
| 2012/0311438 A1 | 12/2012 | Cranfill | |
| 2012/0327009 A1 | 12/2012 | Fleizach | |
| 2013/0019263 A1 | 1/2013 | Ferren | |
| 2013/0067510 A1* | 3/2013 | Ahanger et al. | 725/34 |
| 2013/0073932 A1* | 3/2013 | Migos et al. | 715/201 |
| 2013/0104017 A1 | 4/2013 | Ko | |
| 2013/0135309 A1 | 5/2013 | King | |
| 2013/0183943 A1 | 7/2013 | Tow | |
| 2013/0194269 A1 | 8/2013 | Matas | |
| 2013/0194307 A1 | 8/2013 | Matas | |
| 2013/0198261 A1 | 8/2013 | Matas | |
| 2013/0198631 A1 | 8/2013 | Matas | |
| 2013/0198661 A1 | 8/2013 | Matas | |
| 2013/0198663 A1 | 8/2013 | Matas | |
| 2013/0198664 A1 | 8/2013 | Matas | |
| 2013/0198665 A1 | 8/2013 | Matas | |
| 2013/0198666 A1 | 8/2013 | Matas | |
| 2013/0198668 A1* | 8/2013 | Matas et al. | 715/767 |
| 2013/0198681 A1 | 8/2013 | Matas | |
| 2013/0198682 A1 | 8/2013 | Matas | |
| 2013/0198683 A1 | 8/2013 | Matas | |
| 2013/0205210 A1 | 8/2013 | Jeon | |
| 2013/0227494 A1 | 8/2013 | Matas | |
| 2013/0339907 A1 | 12/2013 | Matas | |
| 2013/0346906 A1 | 12/2013 | Farago | |
| 2014/0013283 A1 | 1/2014 | Matas | |
| 2014/0033124 A1 | 1/2014 | Sorrick | |
| 2014/0046809 A1 | 2/2014 | Baker | |
| 2014/0288686 A1* | 9/2014 | Sant et al. | 700/94 |

OTHER PUBLICATIONS

U.S. Appl. No. 13/487,805, filed Jun. 4, 2012, Matas.
U.S. Appl. No. 13/555,607, filed Jul. 23, 2012, Matas.
U.S. Appl. No. 13/555,657, filed Jul. 23, 2012, Matas.
U.S. Appl. No. 13/555,845, filed Jul. 23, 2012, Matas.
U.S. Appl. No. 13/488,039, filed Jun. 4, 2012, Matas.
U.S. Appl. No. 13/555,876, filed Jul. 23, 2012, Matas.
U.S. Appl. No. 13/488,076, filed Jun. 4, 2012, Matas.
U.S. Appl. No. 13/555,909, filed Jul. 23, 2012, Matas.
U.S. Appl. No. 13/490,367, filed Jun. 6, 2012, Matas.
U.S. Appl. No. 13/490,736, filed Jun. 7, 2012, Matas.
U.S. Appl. No. 13/489,172, filed Jun. 5, 2012, Matas.
U.S. Appl. No. 13/491,100, filed Jun. 7, 2012, Matas.
U.S. Appl. No. 13/489,265, filed Jun. 5, 2012, Matas.
U.S. Appl. No. 14/569,475, Dec. 12, 2014, Matas.
U.S. Appl. No. 14/572,405, Dec. 16, 2014, Matas.
Response to Final Office Action for U.S. Appl. No. 13/487,765, Dec. 29, 2014.
Final Office Action for U.S. Appl. No. 13/487,765, Oct. 3, 2014.

(56) References Cited

OTHER PUBLICATIONS

Response to Non-Final Office Action for U.S. Appl. No. 13/487,765, Aug. 13, 2014.
Non-Final Office Action for U.S. Appl. No. 13/487,765, Mar. 14, 2014.
Response to Final Office Action for U.S. Appl. No. 13/487,805, Dec. 29, 2014.
Final Office Action for U.S. Appl. No. 13/487,805, Sep. 26, 2014.
Response to Non-Final Office Action for U.S. Appl. No. 13/487,805, Jul. 31, 2014.
Non-Final Office Action for U.S. Appl. No. 13/487,805, Apr. 3, 2014.
Final Office Action for U.S. Appl No. 13/555,607, Dec. 3, 2014.
Response to Non-Final Office Action for U.S. Appl. No. 13/555,607, Nov. 4, 2014.
Non-Final Office Action for U.S. Appl. No. 13/555,607, Aug. 20, 2014.
Amendment under Rule 312 for U.S. Appl. No. 13/555,657, Dec. 30, 2014.
Notice of Allowance for U.S. Appl. No. 13/555,657, Dec. 5, 2014.
Response to Non-Final Office Action for U.S. Appl. No. 13/555,657, Nov. 19, 2014.
Non-Final Office Action for U.S. Appl. No. 13/555,657, Sep. 18, 2014.
Response to Non-Final Office Action for U.S. Appl. No. 13/555,845, Oct. 24, 2014.
Non-Final Office Action for U.S. Appl. No. 13/555,845, Apr. 24, 2014.
Final Office Action for U.S. Appl. No. 13/488,039, Dec. 12, 2014.
Response to Non-Final Office Action for U.S. Appl. No. 13/488,039, Nov. 7, 2014.
Non-Final Office Action for U.S. Appl. No. 13/488,039, Jun. 11, 2014.
Final Office Action for U.S. Appl. No. 13/555,876, Nov. 20, 2014.
Response to Non-Final Office Action for U.S. Appl. No. 13/555,876, Oct. 23, 2014.
Non-Final Office Action for U.S. Appl. No. 13/555,876, filed Jul. 14, 2014.
Response to Final Office Action for U.S. Appl. No. 13/488,076, filed Dec. 29, 2014.
Final Office Action for U.S. Appl. No. 13/488,076, filed Oct. 3, 2014.
Response to Non-Final Office Action for U.S. Appl. No. 13/488,076, filed Jul. 31, 2014.
Non-Final Office Action for U.S. Appl. No. 13/488,076, filed Apr. 1, 2014.
Non-Final Office Action for U.S. Appl. No. 13/555,909, filed Nov. 14, 2014.
Response to Final Office Action for U.S. Appl. No. 13/555,909, Aug. 8, 2014.
Final Office Action for U.S. Appl. No. 13/555,909, Apr. 28, 2014.
Response to Non-Final Office Action for U.S. Appl. No. 13/555,909, Mar. 27, 2014.
Non-Final Office Action for U.S. Appl. No. 13/555,909, Jan. 2, 2014.
Non-Final Office Action for U.S. Appl. No. 13/490,367, Nov. 20, 2014.
Response to Final Office Action for U.S. Appl. No. 13/490,367, Sep. 19, 2014.
Final Office Action for U.S. Appl. No. 13/490,367, May 1, 2014.
Response to Non-Final Office Action for U.S. Appl. No. 13/490,367, Apr. 4, 2014.
Non-Final Office Action for U.S. Appl. No. 13/490,367, Jan. 3, 2014.
Notice of Allowance for U.S. Appl. No. 13/490,736, Nov. 21, 2014.
Response to Non-Final Office Action for U.S. Appl. No. 13/490,736, Oct. 23, 2014.
Non-Final Office Action for U.S. Appl. No. 13/490,736, Jul. 8, 2014.
Final Office Action for U.S. Appl. No. 13/489,172, Dec. 12, 2014.
Response to Non-Final Office Action for U.S. Appl. No. 13/489,172, Aug. 12, 2014.
Non-Final Office Action for U.S. Appl. No. 13/489,172, Mar. 28, 2014.
Response to Non-Final Office Action for U.S. Appl. No. 13/491,100, Oct. 30, 2014.
Non-Final Office Action for U.S. Appl. No. 13/491,100, Jul. 31, 2014.
Notice of Allowance for U.S. Appl. No. 13/489,265, Nov. 7, 2014.
Response to Non-Final Office Action for U.S. Appl. No. 13/489,265, Oct. 28, 2014.
Non-Final Office Action for U.S. Appl. No. 13/489,265, May 2, 2014.
Response to Non-Final Office Action for U.S. Appl. No. 13/677,132, Jan. 5, 2015.
Non-Final Office Action for U.S. Appl. No. 13/677,132, Oct. 3, 2014.
Non-Final Office Action for U.S. Appl. No. 13/677,093, Nov. 21, 2014.

* cited by examiner

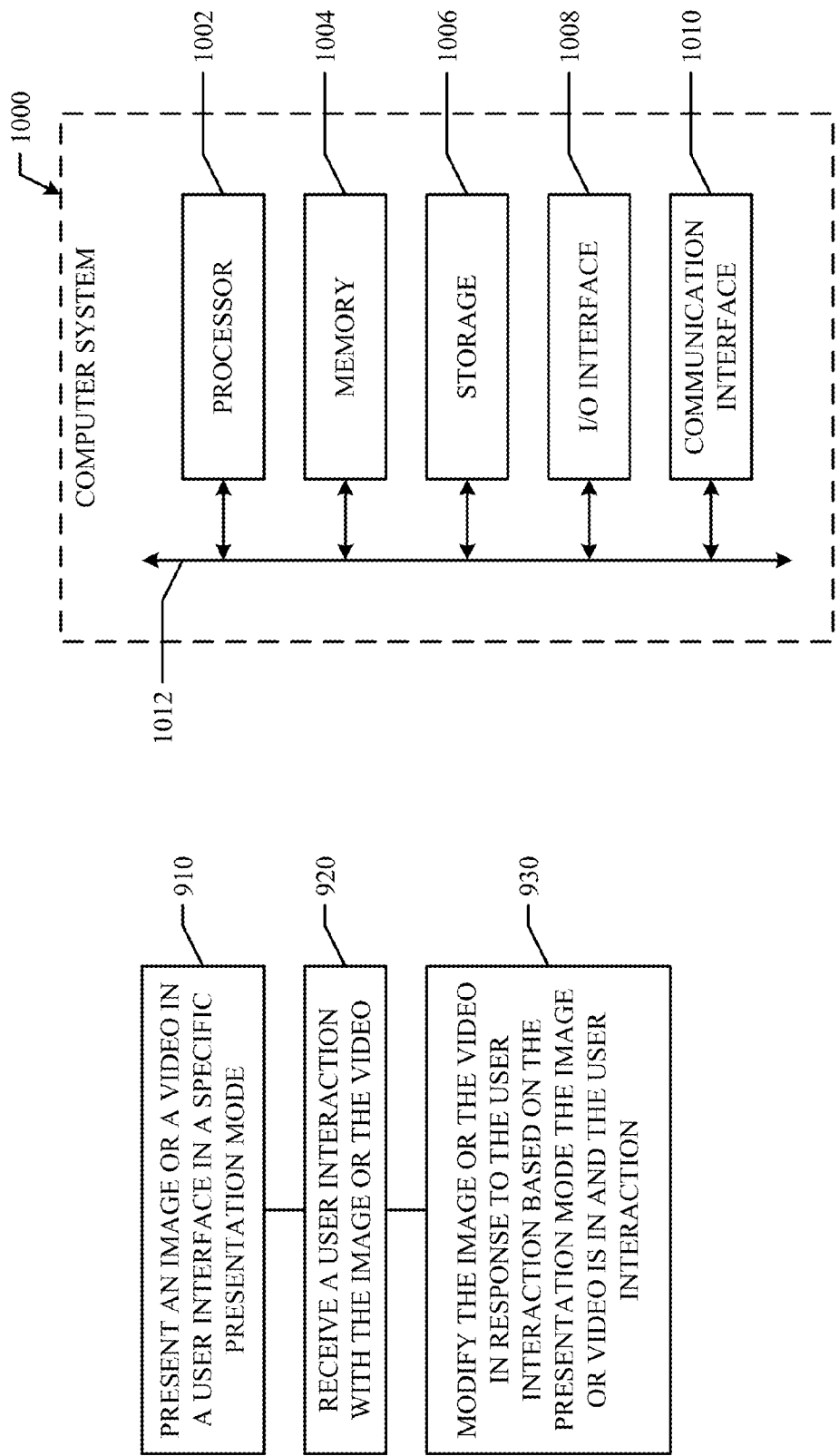

VIDEO OBJECT BEHAVIOR IN A USER INTERFACE

RELATED APPLICATION(S)

This application claims the benefit, under 35 U.S.C. §119 (e), of U.S. Provisional Patent Application No. 61/593,841, filed 1 Feb. 2012, which is incorporated herein by reference.

TECHNICAL FIELD

This disclosure generally relates to presenting multimedia objects, such as images or videos, in a user interface.

BACKGROUND

A user interface (UI), in the industrial design field of human-machine interaction, is the space where interactions between humans and machines occur. The goal of interactions between a human, often referred to as a "user", and a machine at the user interface is user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

BRIEF DESCRIPTION OF THE DRAWINGS

FIG. 9 illustrates an example method that enables a user to manipulate an image or a video.
FIG. 10 illustrates an example electronic device.

DESCRIPTION OF EXAMPLE EMBODIMENTS

In particular embodiments, a user interface (UI), and more specifically, a graphical user interface (GUI) may include any number of UI components or elements arranged in a hierarchy. The components of a user interface may be presented to users according to the hierarchical structure. In particular embodiments, some of these UI components may correspond to or represent multimedia objects, such as images, videos, or audios. Sometimes, these multimedia UI components may be presented to users individually on their own. Other times, they may be presented to users while contained in other UI components, such as being included in a window, a panel, or a web page. In particular embodiments, there may be multiple presentations modes for presenting images or videos in a user interface.

In particular embodiments, a user may interact with a multimedia UI component using a suitable input device (e.g., a finger or stylus on a touch-sensitive screen or a mouse). For example, the user may play or pause a video, or zoom or pan or rotate an image. In particular embodiments, depending on how or where a multimedia UI component is presented to a user (e.g., which presentation mode it is in), the user's interaction with the multimedia UI component may result in different behaviors from the multimedia UI component.

Object Hierarchy

In particular embodiments, objects may be organized into a hierarchy. For example, objects may be organized into a hierarchy based on how the individual objects are related to each other. The object hierarchy may have any number of levels, and at each level, there may be any number of objects. Parent-child or sibling relationships may exist between specific objects in the hierarchy. Within the hierarchy, a parent object is one level above the level of its child objects. Two sibling objects are at the same level and share the same parent object. In addition, any portion of the hierarchy may also be considered a hierarchy in itself.

Figure 1:
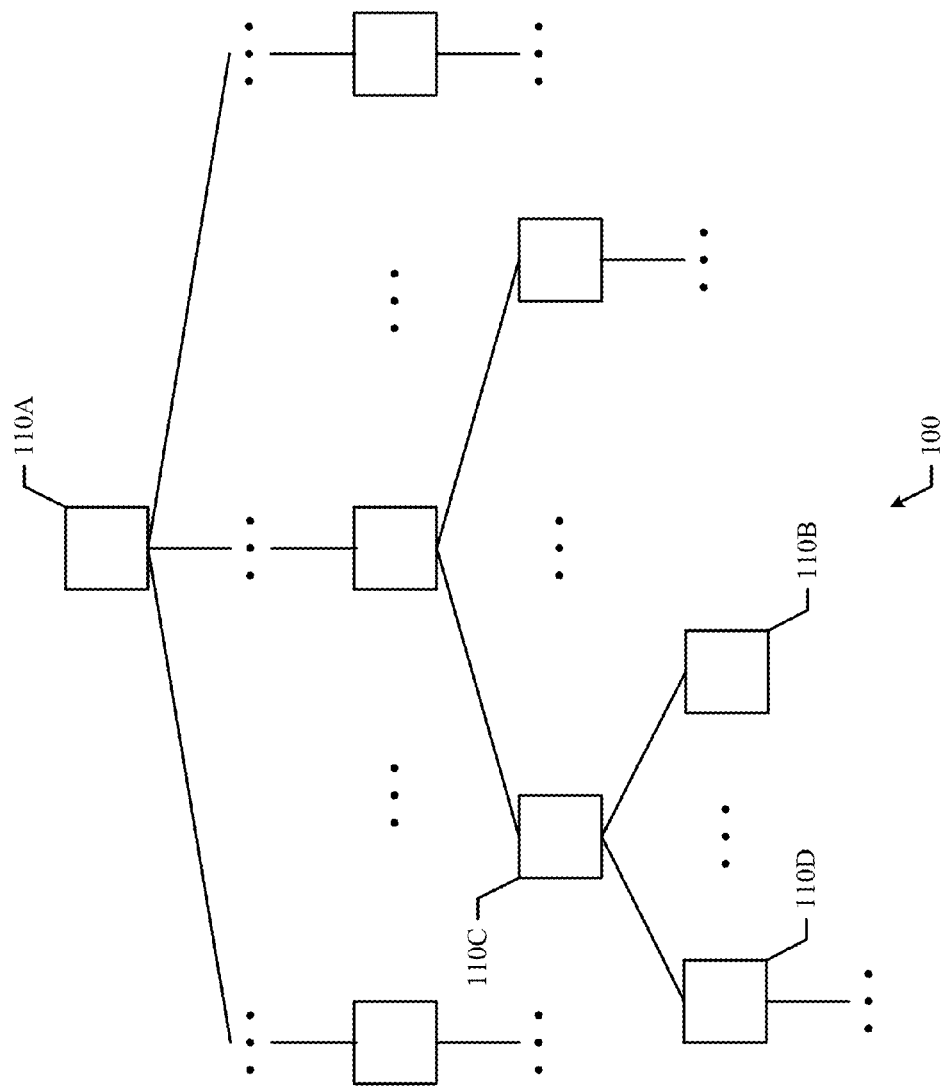
FIG. 1 illustrates a portion of an example object hierarchy.

FIG. 1 illustrates a portion of an example object hierarchy 100 that includes a number of objects 110. In particular embodiments, an object in a hierarchy may or may not have a parent. If an object does not have a parent, it may be referred to as a "root" object (e.g., object 110A). In particular embodiments, an object in a hierarchy may or may not have any children. If an object does not have any children, it may be referred to as a "leaf" or "terminal" object (e.g., object 110B). If an object does have children (e.g., object 110C), it may have any number of children. In addition, objects sharing the same parent may be referred to as each other's "siblings". For example, in FIG. 1, object 110C is the parent of objects 110D and 110B. Objects 110D and 110B are the children of object 110C and are siblings to each other. Thus, a hierarchy of objects (e.g., object hierarchy 100) not only includes the individual objects themselves but also indicates the relationships among the specific objects. Moreover, the position of a specific object within the hierarchy may indicate its relationships with other objects in the hierarchy.

Objects may be of any applicable types. In particular embodiments, an object may be a component of a user interface. In this case, the object hierarchy may be a UI hierarchy (e.g., a hierarchy of UI components). In other words, components of a user interface may be organized into a hierarchy. The UI hierarchy may have any number of layers corresponding to the levels of the object hierarchy, and at each layer, there may be any number of UI components. The position of a specific UI component within the hierarchy may indicate its relationships with other UI components in the hierarchy. The UI components may be presented to users according to the hierarchical structure (e.g., in layers). In particular embodiments, some of these UI components may be multimedia objects, such as images, videos, or audios.

In particular embodiments, an object may correspond to a piece of user-consumable content. In particular embodiments, an object may be consumed by a user if the user may, for example and without limitation, interact with, view, read, listen to, manipulate, or handle the object. For example, some user-consumable objects may be texts, images, videos, audios, feeds, executables (e.g., application programs or games), websites, web pages, digital books, photo albums, posts, or messages. In particular embodiments, user-consumable content, or more specifically, user-consumable objects, may be organized into a hierarchy based on, for example, the relationships among the individual pieces of user-consumable content. Consequently, a hierarchy of user-consumable content may be represented as a hierarchy of objects, where individual objects in the hierarchy may correspond to specific pieces of user-consumable content (e.g., texts, images, videos, audios, executables, etc.). In addition, the structure of the hierarchy indicates the relationships among the specific pieces of user-consumable content.

In particular embodiments, the relationships among the objects in a hierarchy may correspond to how the objects are organized and presented to users. In particular embodiments, when presenting a hierarchy of objects to a user of a device, the objects may be organized and presented according to the structure of the object hierarchy. More specifically, the objects may be presented in a user interface provided on the device according to the structure of the object hierarchy so that the user interface itself becomes hierarchical as well. Consequently, the user interface may include a number of layers, respectively corresponding to the levels in the object hierarchy. The positions of the objects within the hierarchy are preserved in the user interface, such that a specific object at a specific position in the hierarchy is presented in the corresponding position in the user interface. The relationships among the objects within the hierarchy are maintained in the user interface. In other words, there may be an one-to-one correspondence between an object in the object hierarchy and a UI component in the user interface, such that each object is represented by a UI component.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or any graphical user interface (GUI) or content or media elements on each page. Each of these also corresponds to an object in the hierarchy. More specifically, when these objects are organized in a hierarchy, the book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or any GUI or content or media elements on that page. A text block, image, video, audio, or GUI or content or media element is one of the child objects of the page to which it belongs. Similarly, for a software application that manages news feeds, its components may include the individual news channels and the news stories within each channel. Each of these may correspond to an object. When these objects are arranged in a hierarchy, the news-feed application, while itself being one of the child objects of the desktop, is also the parent object of the news channels. A news channel in turn is the parent object of the news stories included in that channel. Some of these objects may respectively correspond to UI components of a user interface presented on the computing device.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy. Some of these objects may respectively correspond to UI components of a web-based user interface that may be presented to a user through a web browser.

As a third example, a website, such as a social-networking website, may also be arranged in such a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, etc. In particular embodiments, child objects in the hierarchy may also include applications the user has added to the profile page, such as a Spotify music sharing application. Moreover, individual stories, songs the user has listened to, and playlists may be child objects at a lower hierarchical level. In particular embodiments, child objects in the hierarchy may include particular sections of a user's profile, such as the user's education and employment information, or the public "wall" of the user's profile page. This disclosure contemplates representing and addressing any collection of content in a hierarchical object or nodal structure. Again, these objects may respectively correspond to UI components of a web-based user interface that may be presented to a user through a web browser.

As these examples illustrate, an object may be of any type and this disclosure contemplates any applicable types of objects. For example and without limitation, the term "object" may refer to any type of content, including but not limited to images, videos, captions, text blocks or boxes, user interface elements, URLs, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

Video Object

In particular embodiments, an object in a hierarchy may be a video, which may be presented to a user for viewing. Consequently, there may be a video component in a user interface corresponding to the video object. In particular embodiments, there may be several modes for presenting a video object in a user interface, and this disclosure contemplates any applicable presentation modes for presenting video objects. The video object may be presented to a user in any one of these available modes. There may be different video components in the user interface for presenting the video object in different modes.

Figure 2A:
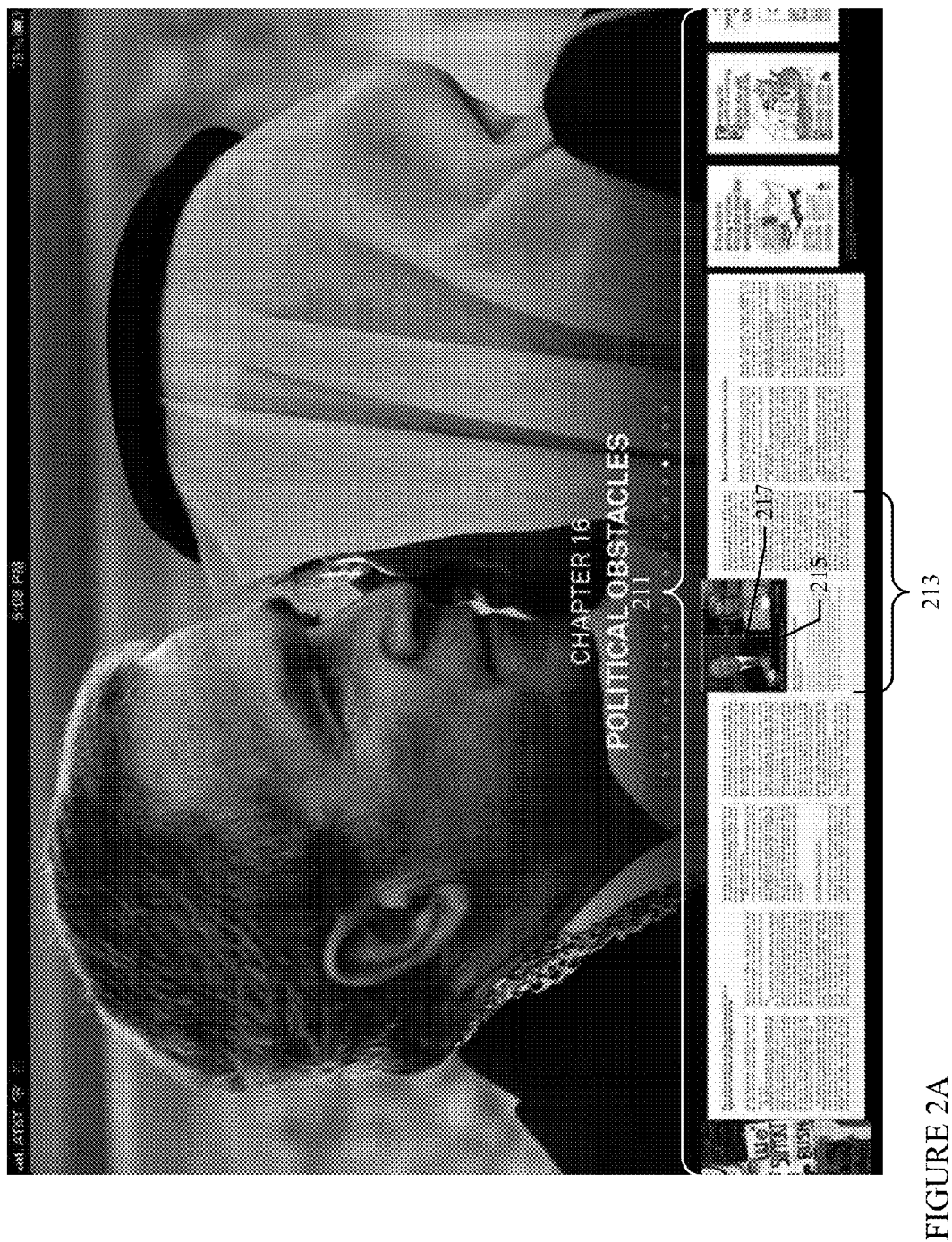
FIGS. 2A-2D illustrate example modes for presenting a video object in a user interface.

In particular embodiments, a video object may be presented in a user interface in an index mode (also referred to as table-of-content (TOC) mode), as illustrated in FIG. 2A. Sometimes, a video object may be included in an index of user-consumable content or in a table of content, and the index mode may be suitable for presenting the video object in such a situation. As an example, a digital book may include a number of chapters; each chapter may include a number of pages; and each page may include a number of text blocks, images, videos, etc. These objects (e.g., book, chapter, page, text block, image, video, etc.) may be organized in a hierarchy, and each of these objects may correspond to a UI component. As illustrated in FIG. 2A, given a specific chapter, the pages in that chapter may be presented in a table of content (TOC) 211 so that a user may browse through these pages quickly and perhaps select a specific page to read in further detail. Suppose that a specific page 213 includes a video 215. Video 215 may be presented in TOC 211, as a part of page 213, in the index mode. Video 215 may be shown in a thumbnail (i.e., small) size, in proportion to the sizes of page 213 and TOC 211. As another example, a social-networking website may include a number of user accounts; each user account may include a number of media folders or albums (among other items); and each media folder may include a number of videos or images. Again, these objects (e.g., website, user account, media folder, video, image, etc.) may be organized in a hierarchy. Given a specific media folder, the videos in that folder may be presented in an index of video objects so that a user may browse through these videos and perhaps select a specific video for playback. In this case, each video object may be presented in the index mode.

Figure 2B:
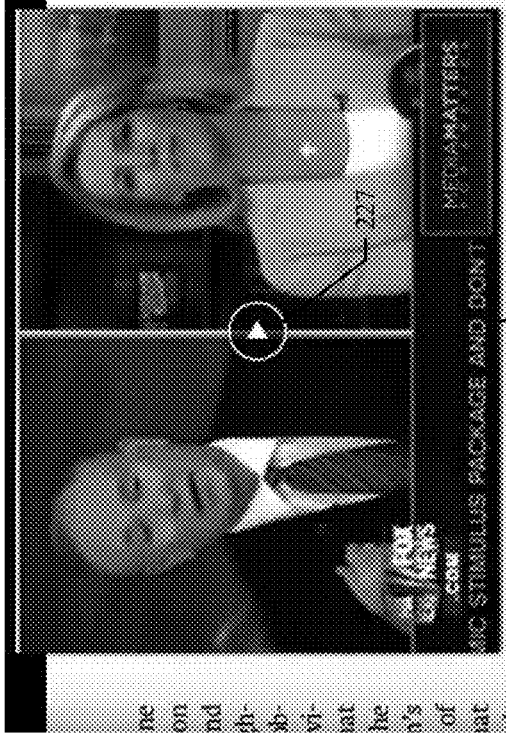

In particular embodiments, a video object may be presented in a user interface in an on-page mode, as illustrated in FIG. 2B. Sometimes, a video object may be included in another UI component (e.g., a web page, a page of a book, etc.). When this other UI component is presented, the video object may be presented as a part of this other UI component. The on-page mode may be suitable for presenting the video object in such a situation. As an example, as illustrated in FIG. 2B, suppose that a page 223 of a digital book includes a video 225. When page 223 is presented, video 225 is presented as a part of page 223, in the on-page mode, together with other content of page 223. Video 225 may be shown in a size that is appropriate or in proportion to the size of page 223 (e.g., half or a quarter of the size of page 223). As another example, a web page may include a video object. When the web page is presented (e.g., displayed in a web browser), the video object may be presented in the web page and as a part of the web page in the on-page mode, together with other content of the web page.

Figure 2C:
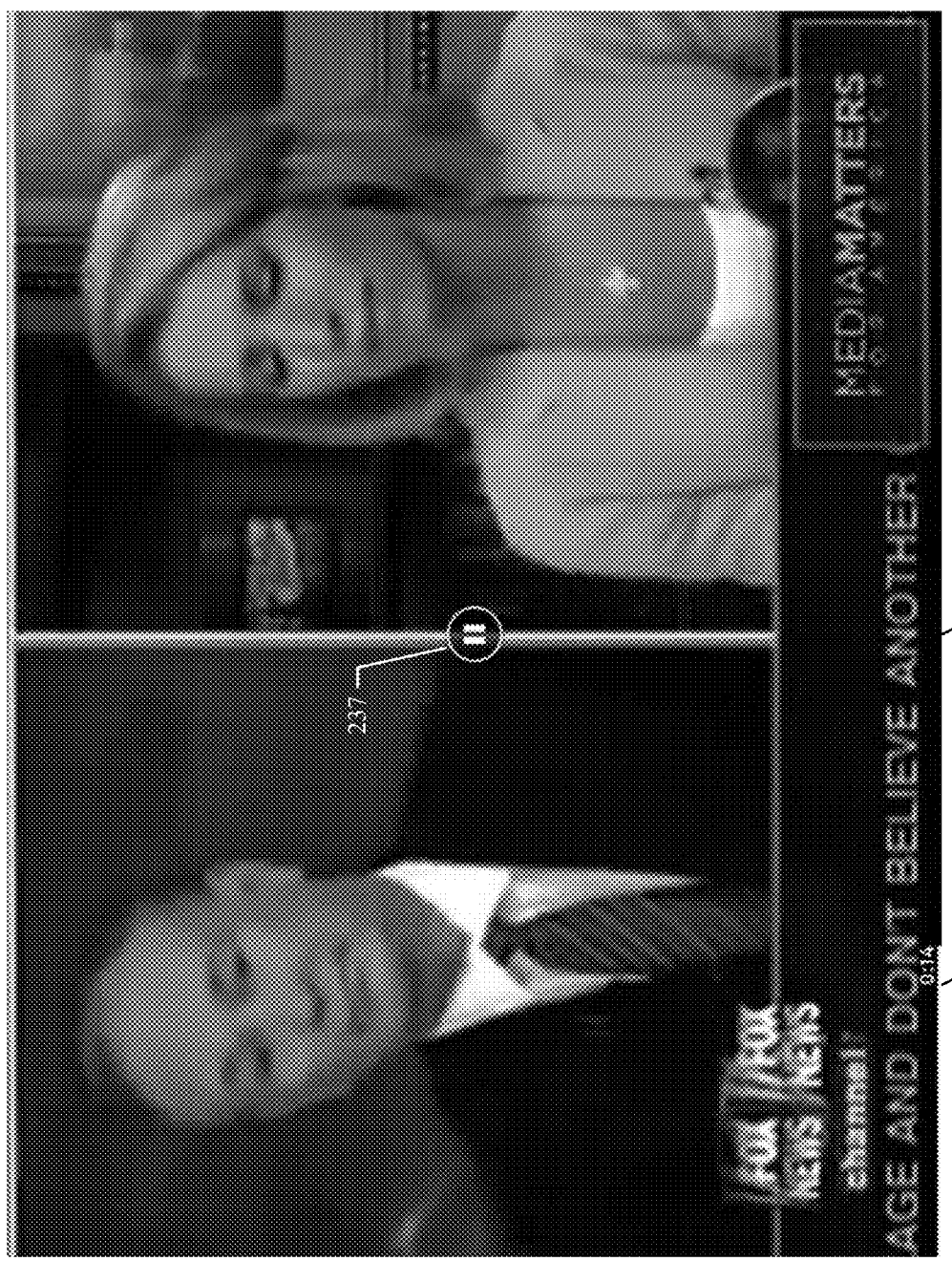

In particular embodiments, a video object may be presented in a user interface in a full-screen mode, as illustrated in FIG. 2C. Sometimes, a video object may be presented by itself. The full-screen mode may be suitable for presenting the video object in such a situation. For example, as illustrated in FIG. 2C, a video 235 is presented in the full-screen mode where it may be the only or the main UI component displayed on the screen of a device and may occupy substantially the entire display area of the screen (e.g., greater than 90% of the display area of the screen or 100% of the display area of the screen).

A user may interact with a video object presented in any of the available modes, and in particular embodiments, depending on which mode the video object is in, the user's interaction with the video object may result in different behavioral responses. In some cases, the user's interaction with the video object in one presentation mode may cause the video object to automatically transition to another presentation mode.

In particular embodiments, while in each of the presentation modes (e.g., index mode, on-page mode, full-screen mode), there may be playback control icons or buttons associated with a video object (e.g., icon 217 in FIG. 2A, icon 227 in FIG. 2B, icon 237 in FIG. 2C). A user may tap on these control icons to cause the video to start or pause playing. For example, while the video is being played, a pause icon (e.g., icon 237 in FIG. 2C) may be associated with the video. The user may tap on the pause icon to cause the video to pause playing. On the other hand, while the video is paused, a play icon (e.g., icon 227 in FIG. 2B) may be associated with the video. The user may tap on the play icon to cause the video to start or resume playing. The user may start or stop playback of the video at any time.

In particular embodiments, while a video object is presented in the index mode, such as video 215 in FIG. 2A, the user may single tap any part of video 215 or pinch open video 215 (e.g., using two fingers on a touch-sensitive screen), which may cause the video object to transition to the on-page mode, such as video 225 in FIG. 2B. In particular embodiments, while a video object is presented in the on-page mode, such as video 225 in FIG. 2B, the user may single tap any part of video 225 or pinch open video 225, which may cause the video object to transition to the full-screen mode, such as video 235 in FIG. 2C. Conversely, in particular embodiments, while a video object is presented in the full-screen mode, such as video 235 in FIG. 2C, the user may double tap any part of video 235 or pinch close video 235 (e.g., using two fingers on a touch-sensitive screen), which may cause the video object to transition to the on-page mode, such as video 225 in FIG. 2B. In particular embodiments, while a video object is presented in the on-page mode, such as video 225 in FIG. 2B, the user may double tap any part of video 225 or pinch close video 225, which may cause the video object to transition to the index mode, such as video 215 in FIG. 2A.

In particular embodiments, while a video object transitions from one presentation mode to another presentation mode, the playback status of the video is unaffected. That is, if the video is being played while the mode transition occurs, the video continues to play, until either the user stops the playback or the video ends. On the other hand, if the video is paused while the mode transition occurs, the video continues to pause. The user may pause or resume playback of the video using, for example, the appropriate control icon.

In particular embodiments, there is a consistency between different presentation modes. When an object (e.g., image, video) is presented in a user interface and the object is being manipulated by a user (e.g., picked up, rotated, zoomed in or out, etc.), the object itself, not the UI component representing the object, is manipulated. This ensures the self-consistency of the user interface. For example, while a video is being played, the user may manipulate the video object (e.g., pinched down to the index mode or pinched up to the full-screen mode). While the video object is being manipulated by the user, the playback of the video continues uninterrupted.

In particular embodiments, while in the index mode (e.g., video 215 in FIG. 2A) or the on-page mode (e.g., video 225 in FIG. 2B), if the user clicks or taps the play icon to start playing a video, the video may automatically transition to the full-screen mode (e.g., video 235 in FIG. 2C) and the control icon may fade away. Conversely, in particular embodiments, while in the full-screen mode, if the user pauses or stops the playback of the video or if the video ends, the video may automatically transition back to the index mode or the on-page mode (i.e., the original mode in which the video had been presented when the user had caused the video to transition to the full-screen mode by starting the playback).

In particular embodiments, when a video object transitions from one presentation mode to another presentation mode, the display size for the visual portion of the video may change accordingly. For example, when transitioning from the index mode to the on-page mode, the size of the video images (i.e., the visual portion of the video) may increase appropriately. Similarly, when transitioning from the on-page mode to the full-screen mode, the size of the video images may increase to occupy the entire display area of the screen. Conversely, when transitioning from the full-screen mode to the on-page mode or from the on-page mode to the index mode, the size of the video images may decrease appropriately. In other words, there may be a suitable size for presenting the visual portion of a video object in each specific mode, and while the video object is presented in a specific mode, its visual portion is presented in the corresponding size for that mode.

In particular embodiments, when a video object transitions from one presentation mode to another presentation mode, the volume level for the audio portion of the video may change accordingly. In other words, there may be a suitable volume level for presenting the audio portion of a video object in each specific mode, and while the video object is presented in a specific mode, its audio is presented in the corresponding volume level for that mode. For example, while in the index mode, the audio of the video object may be presented in a lower volume level so that it does not create much disturbance. While in the on-page mode, the audio of the video object may be presented in a volume level that is somewhat higher (e.g., louder) than that of the index mode. While in the full-screen mode, the audio of the video object may be presented in a volume level that is somewhat higher (e.g., louder) than that of the on-page mode (e.g., a higher volume level). While in each presentation mode, the user may manually adjust (e.g., increase or decrease) the volume level of the audio of the video object to override the default volume level for that mode as desired.

In particular embodiments, while in the index mode (e.g., video 215 in FIG. 2A), if a video is being played, the user may not be able to stop the playback directly in the index mode. Instead, the user needs to transition to the on-page mode (e.g., video 225 in FIG. 2B) first and then uses the pause icon to pause or stop the playback of the video.

In particular embodiments, while in the on-page mode (e.g., video 225 in FIG. 2B), a video object may "float" on top of the UI component containing that video object. For example, as illustrated in FIG. 2B, video 225 floats on top of page 223, and this floating status is visually indicated by showing a small portion (e.g., the top edge) of video 225 slightly outside the boundary of page 223. In particular embodiments, the components of a user interface may be presented according to a hierarchical structure. In this case, page 223 may be the parent object of video 225. Thus, page 223 may be at one layer beneath the layer of video 225 in the user interface. Page 223 and video 225 are two separate UI components corresponding to two objects. In particular embodiments, a floating video object indicates that a user may interact with that video object.

In particular embodiments, while in the on-page mode (e.g., video 225 in FIG. 2B), if a video is being played and the user navigates away from the UI component (e.g., the page) containing the video, the current position of the video may be recorded. If the user comes back to the UI component (e.g., the page) containing the video object at a later time, the video may resume playback from the position where the user has left it.

Figure 2D:
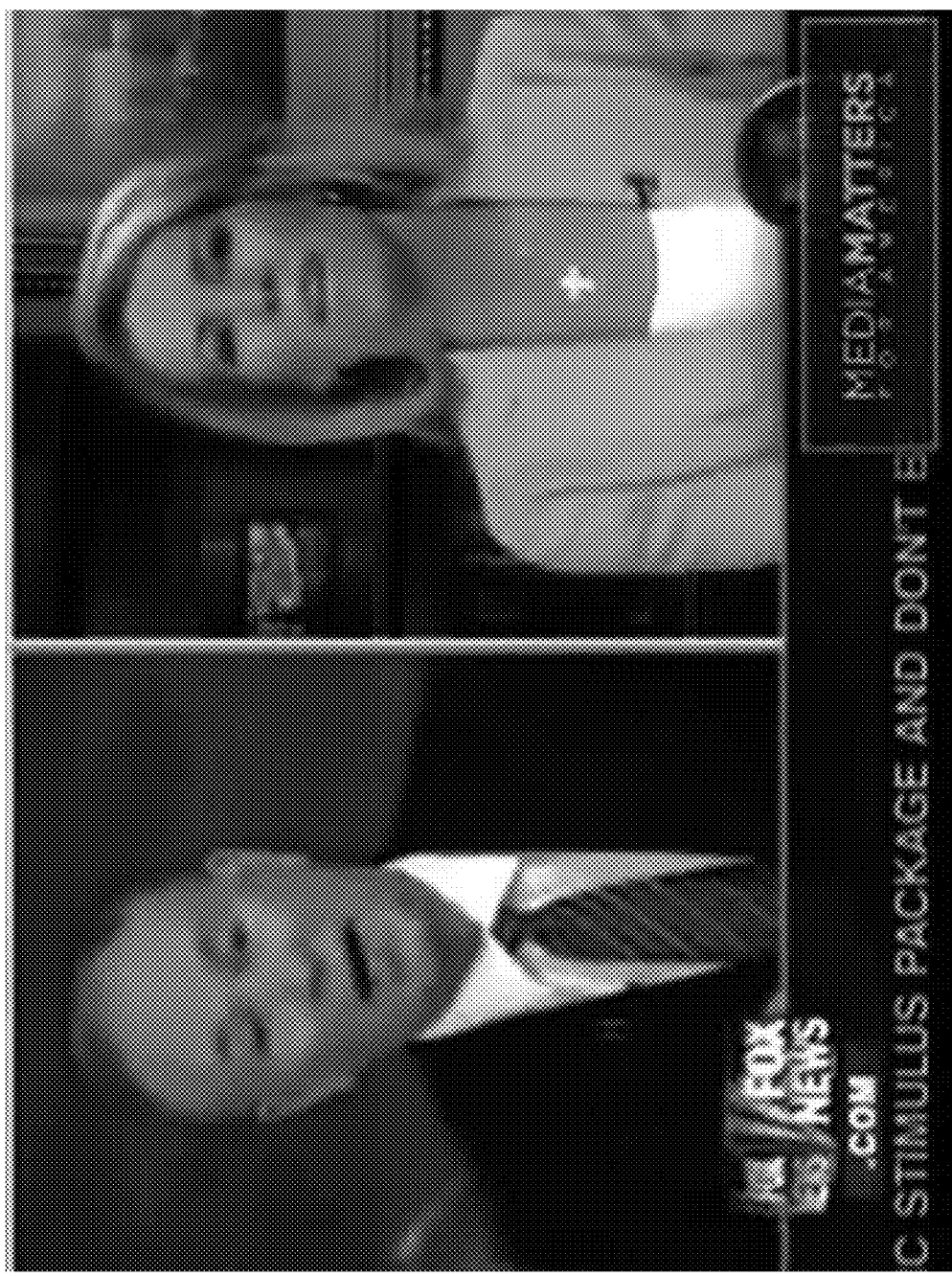

In particular embodiments, while in the full-screen mode, the playback control icon (e.g., icon 237 in FIG. 2C) associated with a video may disappear after it has not been used for a while (e.g., a few seconds) or if the user taps on the video. Only the video itself is presented on the screen, as illustrated in FIG. 2D, so that the user may watch the video undisturbed. The user may bring back the control icon by single tapping the video in the full-screen mode (e.g., video 235 in FIG. 2D) in order to pause or resume playback of the video. In other words, while in the full-screen mode, single tapping on the video may cause the playback control icon associated with the video to appear or disappear. In particular embodiments, while in the full-screen mode, there may be a time indicator (e.g., slider icon 239 in FIG. 2C) associated with the video indicating how much time has elapsed in the video as well as enabling the user to jump to different positions in the video (e.g., be selecting a specific position along slider icon 239).

In particular embodiments, while in each of the presentation mode, if the user indicates that he or she no longer wishes to watch a video by, for example, swiping to the next page or chapter, closing the video object, or otherwise navigating away from the video object, the audio portion of the video object may fade out, instead of, for example, stopping abruptly.

Image Object

In particular embodiments, an object in a hierarchy may be an image, which may be presented to a user for viewing. Consequently, there may be an image component in a user interface corresponding to the image object. In particular embodiments, there may be several modes for presenting an image object in a user interface, and this disclosure contemplates any applicable presentation modes for presenting image objects. The image object may be presented to a user in any one of these available modes. There may be different image components in the user interface for presenting the image object in different modes.

Figure 3A:
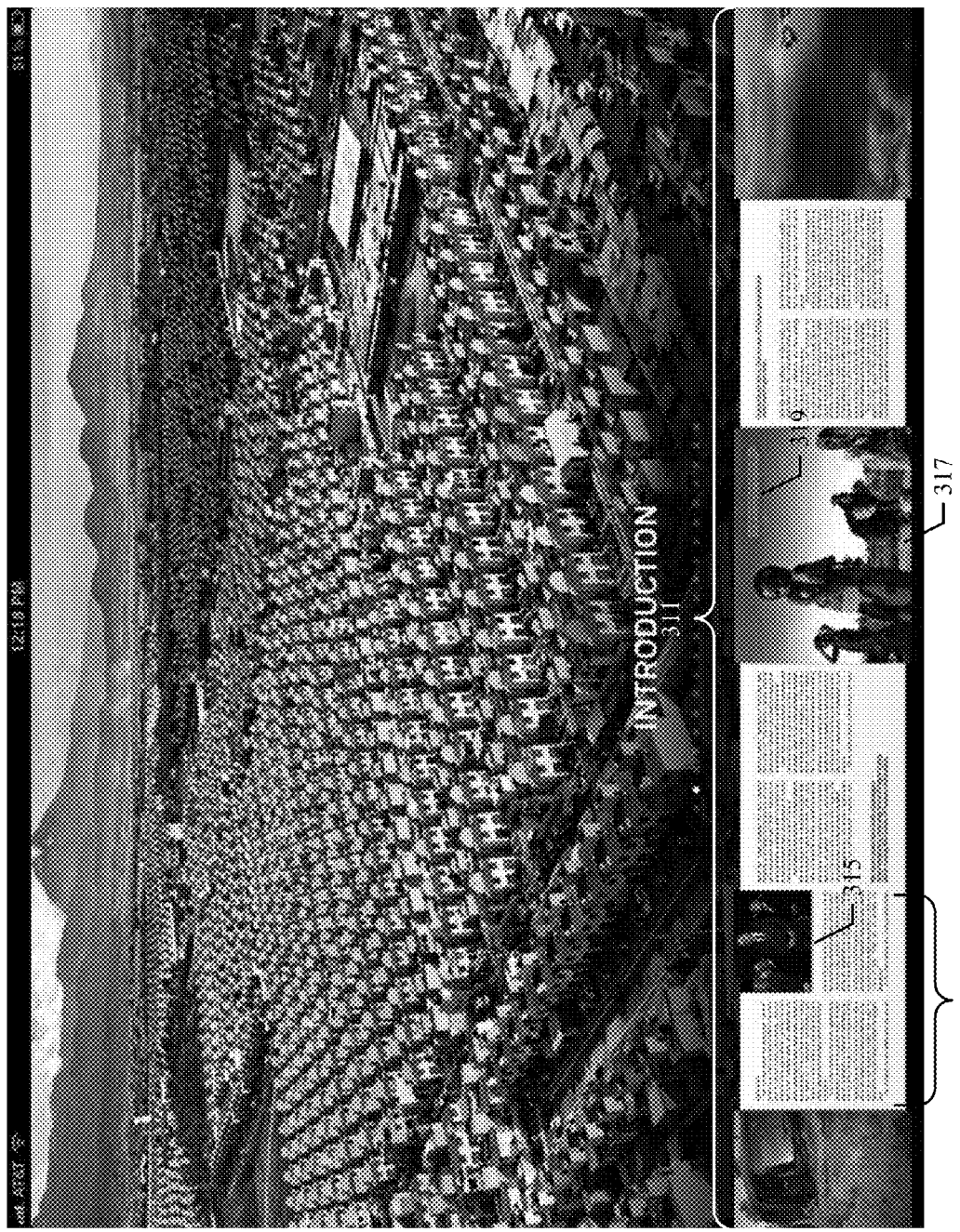
FIGS. 3A-3C illustrate example modes for presenting an image object in a user interface.

In particular embodiments, an image object may be presented in a user interface in an index mode (also referred to as table-of-content (TOC) mode), as illustrated in FIG. 3A. Sometimes, an image object may be included in an index of user-consumable content or in a table of content, and the index mode may be suitable for presenting the image object in such a situation. As an example, a digital book may include a number of chapters; each chapter may include a number of pages; and each page may include a number of text blocks, images, videos, etc. These objects (e.g., book, chapter, page, text block, image, video, etc.) may be organized in a hierarchy, and each of these objects may correspond to a UI component. As illustrated in FIG. 3A, given a specific chapter, the pages in that chapter may be presented in a table of content (TOC) 311 so that a user may browse through these pages quickly and perhaps select a specific page to read in further detail. Suppose that a specific page 313 includes an image 315. Image 315 may be presented in TOC 311, as a part of page 313, in the index mode. Image 315 may be shown in a thumbnail (i.e., small) size, in proportion to the sizes of page 313 and TOC 311. Different images may have different sizes or resolutions. When an image is included in a page, it may occupy a portion of the page, as in the case of image 315 (e.g., occupying a quarter or half of the page) or it may occupy the entire page, as in the case of image 317. When images 315 and 317 are presented in the index mode, their sizes may decrease in proportion to the sizes of the pages that contain them. As another example, a social-networking website may include a number of user accounts; each user account may include a number of media folders or albums (among other items); and each media folder may include a number of videos or images. Again, these objects (e.g., website, user account, media folder, video, image, etc.) may be organized in a hierarchy. Given a specific media folder, the images in that folder may be presented in an index of image objects so that a user may browse through these images and perhaps select a specific image for viewing. In this case, each image object may be presented in the index mode.

Figure 3B:
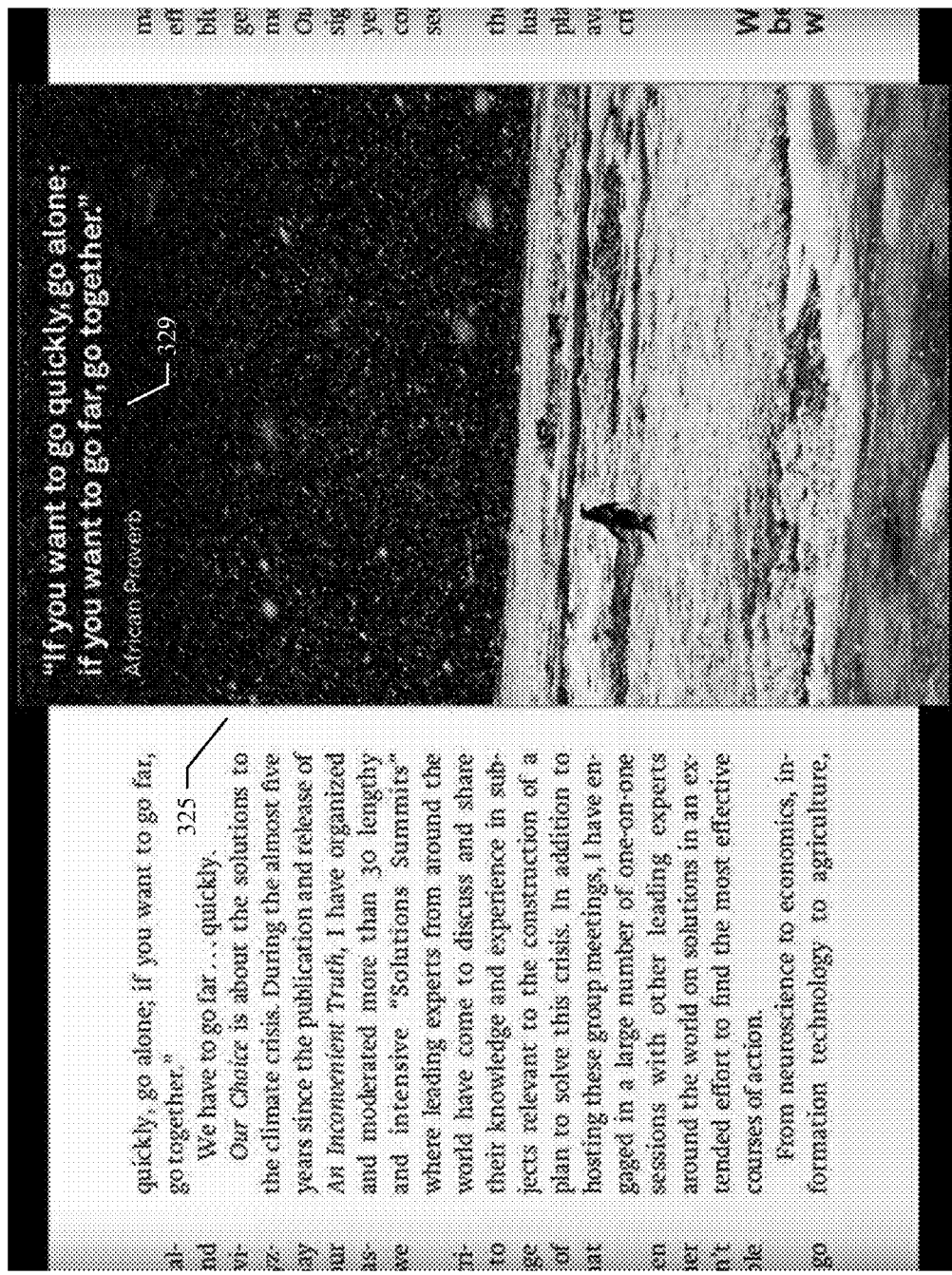

In particular embodiments, an image object may be presented in a user interface in an on-page mode, as illustrated in FIG. 3B. Sometimes, an image object may be included in another UI component (e.g., a web page, a page of a book, etc.). When this other UI component is presented, the image object may be presented as a part of this other UI component. The on-page mode may be suitable for presenting the image object in such a situation. As an example, as illustrated in FIG. 3B, suppose that a page 323 of a digital book includes an image 325. When page 323 is presented, image 325 is presented as a part of page 323, in the on-page mode, together with other content of page 323. Image 325 may be shown in a size that is appropriate or in proportion to the size of page 323. Different images may have different sizes or resolutions and may occupy different areas or portions of a page. For example, an image may occupy a quarter of a page (e.g., top-left quarter, top-right quarter, bottom-left quarter, bottom-right quarter) or half of a page (e.g., top half, bottom half, left half, right half). As another example, a web page may include an image object. When the web page is presented (e.g., displayed in a web browser), the image object may be presented in the web page and as a part of the web page in the on-page mode, together with other content of the web page.

Figure 3C:

In particular embodiments, an image object may be presented in a user interface in a full-screen mode, as illustrated in FIG. 3C. Sometimes, an image object may be presented by itself. The full-screen mode may be suitable for presenting the image object in such a situation. For example, as illustrated in FIG. 3C, an image 335 is presented in the full-screen mode where it may be the only or the main UI component displayed on the screen of a device and may occupy substantially the entire display area of the screen (e.g., greater than 90% of the display area of the screen or 100% of the display area of the screen).

In particular embodiments, while an image object is presented in the index mode, such as image 315 in FIG. 3A, the user may single tap any part of image 315 or pinch open image 315 (e.g., using two fingers on a touch-sensitive screen), which may cause the image object to transition to the on-page mode, such as image 325 in FIG. 3B. In particular embodiments, while an image object is presented in the on-page mode, such as image 325 in FIG. 3B, the user may single tap any part of image 325 or pinch open image 325, which may cause the image object to transition to the full-screen mode, such as image 335 in FIG. 3C. Conversely, in particular embodiments, while an image object is presented in the full-screen mode, such as image 335 in FIG. 3C, the user may double tap any part of image 335 or pinch close image 335 (e.g., using two fingers on a touch-sensitive screen), which may cause the image object to transition to the on-page mode, such as image 325 in FIG. 3B. In particular embodiments, while an image object is presented in the on-page mode, such as image 325 in FIG. 3B, the user may double tap any part of image 325 or pinch close image 325, which may cause the image object to transition to the index mode, such as image 315 in FIG. 3A.

Figure 5A:
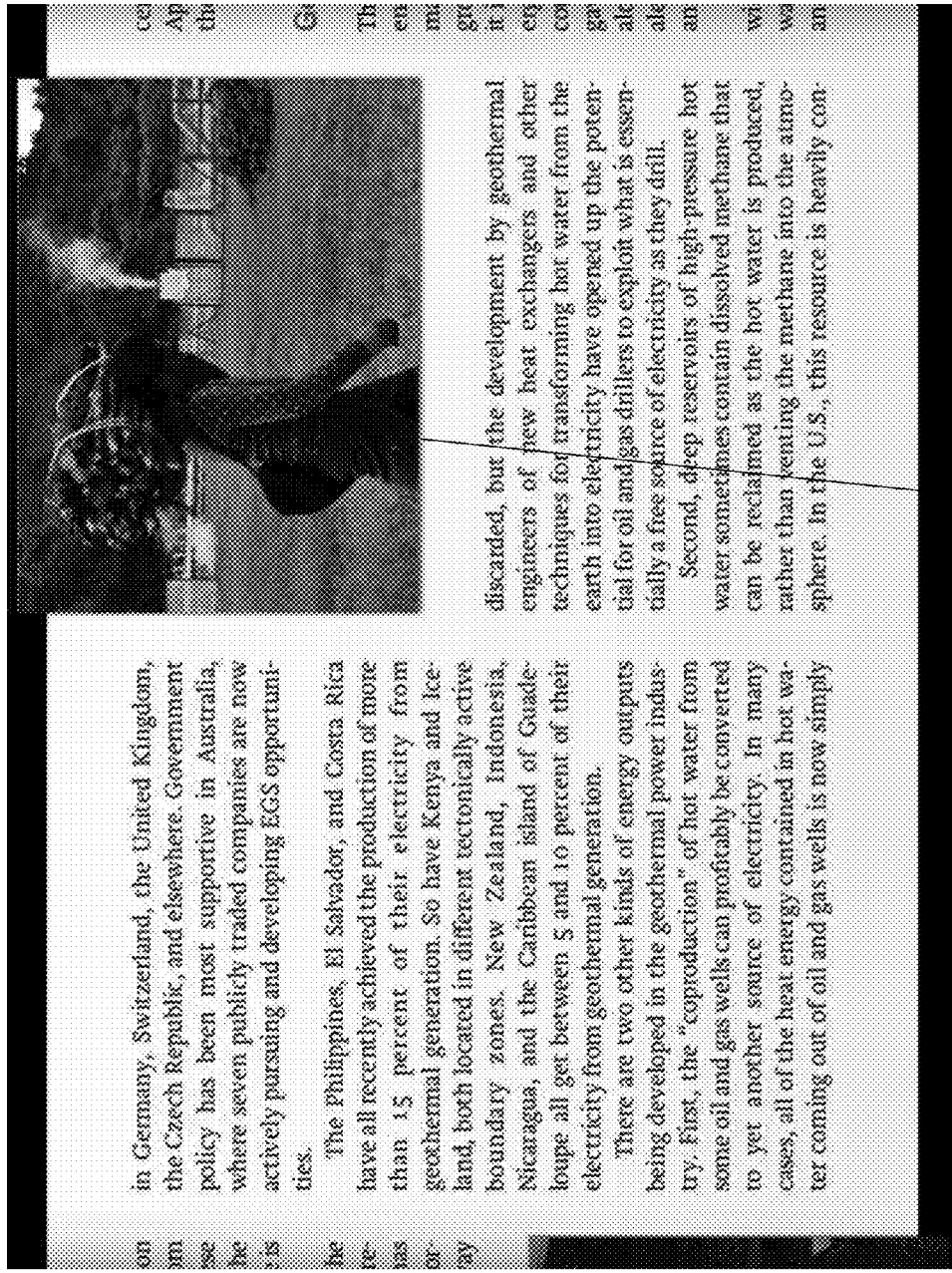
FIGS. 5A-5D illustrate an example transition of an image between two presentation modes.
Figure 5B:
Figure 5C:
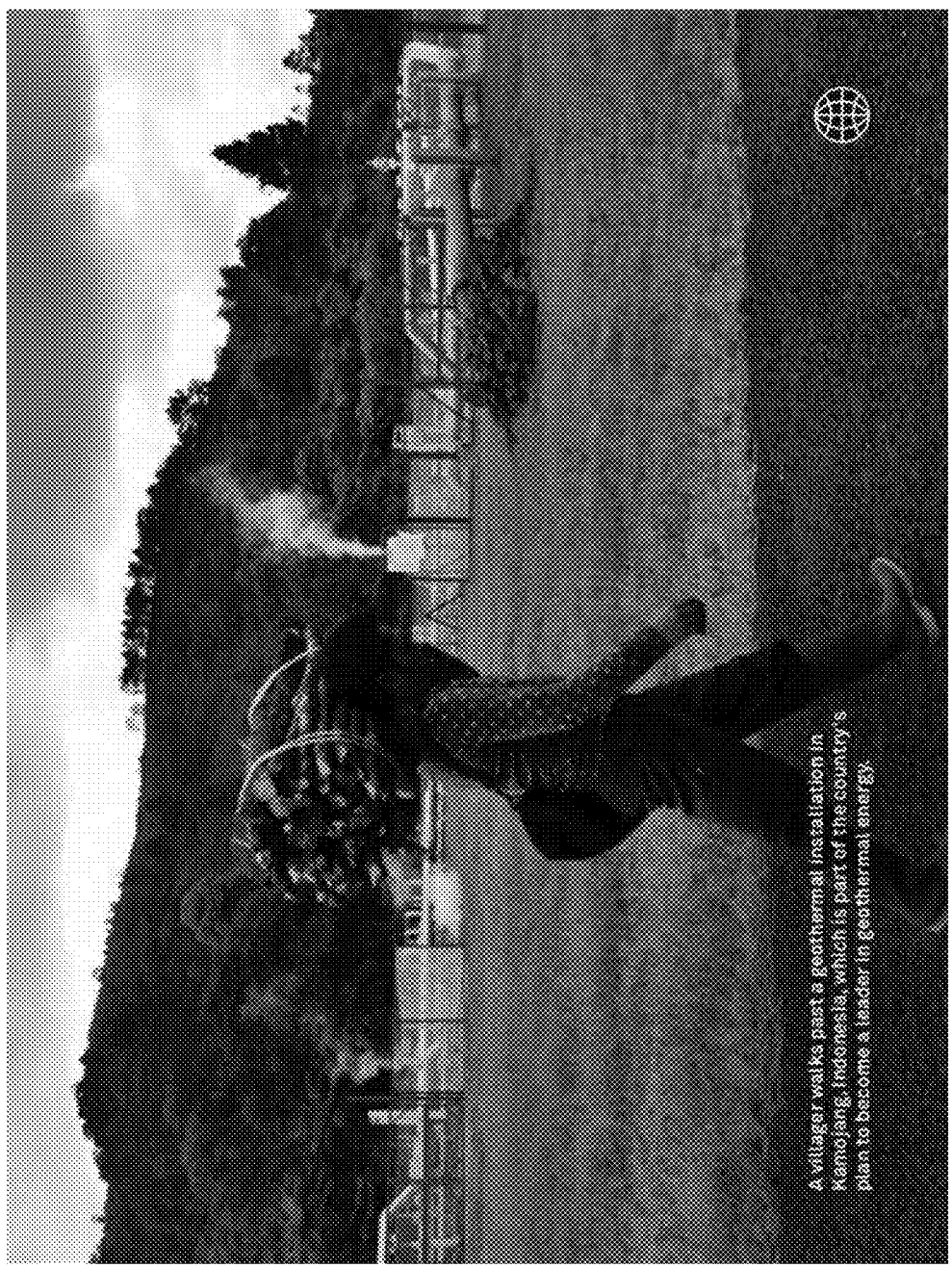
Figure 5D:

In particular embodiments, an image object may have multiple cropped versions in addition to the original, full-size image. The cropped versions may be presented in different modes when appropriate. For example, when an image object is presented in the index mode or the on-page mode, sometimes, the area for displaying the image may be relatively small in comparison to the size of the image. To fit the image in the display area, the image may be re-sized down (e.g., to a smaller size) or a cropped version of the image may be displayed. For example, as illustrated in FIG. 5A, a cropped version 510 of an image is shown in the on-page mode when the image is included in a page of a digital book. In particular embodiments, when a user single taps or pinches open cropped version 510 of the image to cause the image to transition to the full-screen mode, initially, the image may still be shown in the cropped version, as illustrated in FIG. 5B. However, in FIG. 5B, the cropped version of the image occupies the entire screen of the user's device, instead of being included in a page. The image may gradually zoom or pan out, as illustrated in FIG. 5C, until eventually the original, complete image is shown, as illustrated in FIG. 5D. In addition, in particular embodiments, there may be audio commentary associated with an image. While the image is zooming out, as illustrated in FIGS. 5B, 5C, 5D, the audio commentary associate with the image may be played automatically.

In particular embodiments, while an image object is presented in each of the presentation modes (e.g., index mode, on-page mode, full-screen mode), text may be overlaid on top of the image (e.g., text 319 in FIG. 3A, text 329 in FIG. 3B, text 339 in FIG. 3C). For example, the text may be a caption or description of the associated image.

In particular embodiments, while in the on-page mode (e.g., image 325 in FIG. 3B), an image object may "float" on top of the UI component containing that image object. For example, as illustrated in FIG. 3B, image 325 floats on top of page 323, and this floating status is visually indicated by showing a small portion (e.g., the top edge and bottom edge) of image 325 slightly outside the boundary of page 323. In particular embodiments, the components of a user interface may be presented according to a hierarchical structure. In this case, page 323 may be the parent object of image 325. Thus, page 323 may be at one layer beneath the layer of image 325 in the user interface. Page 323 and image 325 are two separate UI components corresponding to two objects. In particular embodiments, a floating image object indicates that a user may interact with that image object.

Figure 4:
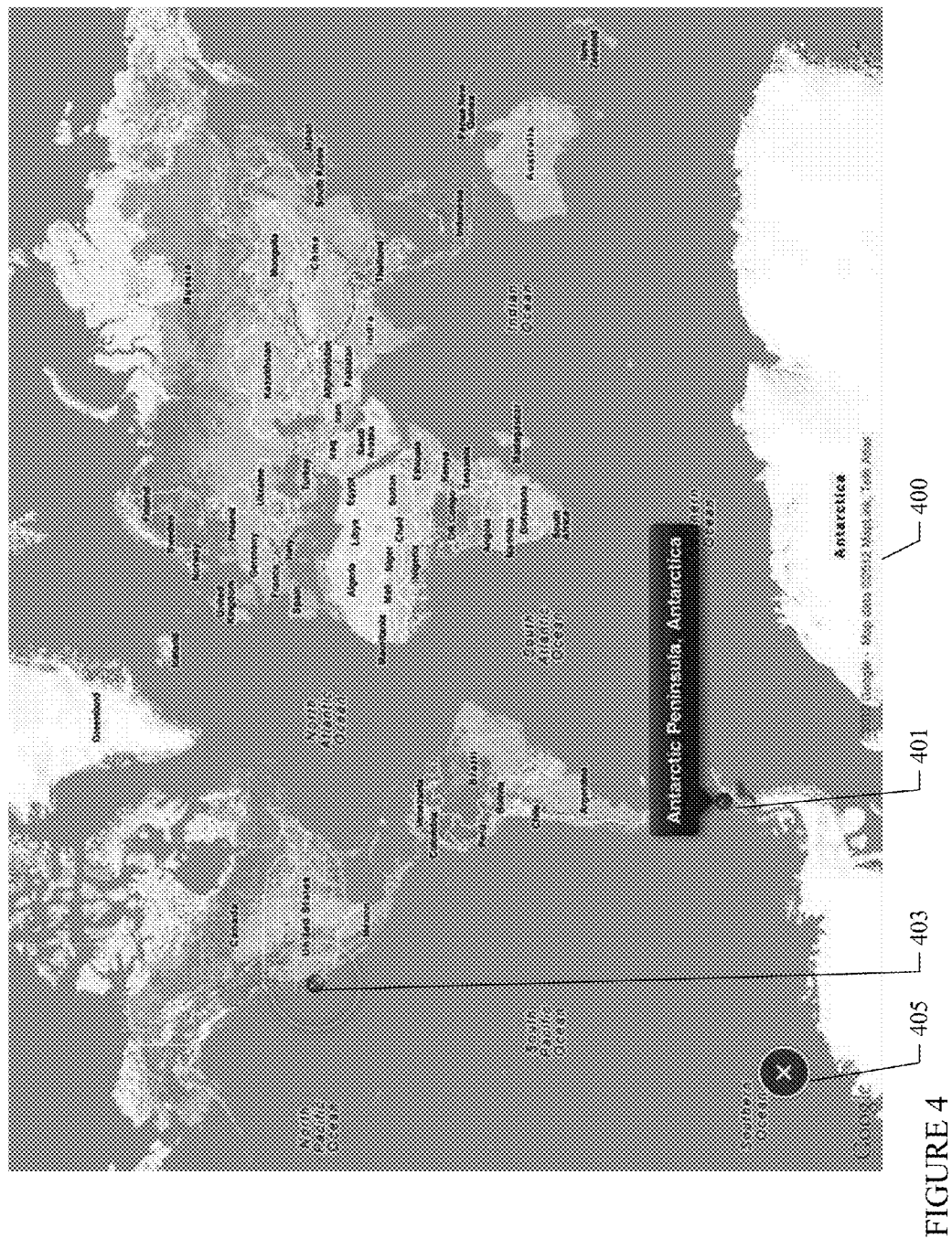
FIG. 4 illustrates an example map associated with a geo-tag attached to an image.

In particular embodiments, while an image object is presented in the full-screen mode, a geo-tag may be associated with or attached to the image object. The geo-tag may represent a geographical location. For example, as illustrated in FIG. 3C, a geo-tag, as represented by geo-tag icon 337, is associated with or attached to image 335 in the full-screen mode. When a user interacts with geo-tag icon 337 (e.g., single tap or click it), the underlying geo-tag may cause a map 400 to be presented, as illustrated in FIG. 4. With some implementations, map 400 may be presented in the full-screen mode, replacing image 335. Map 400 may include an indicator 401 indicating the geographical location of the subject matter in image 335 or where image 335 had been taken and another indicator 403 indicating, if known and enabled by the user and user's device, the current geographical location of the electronic device, and thus its user, displaying the map. In addition, there is a close icon 405 that enables the user to close map 400 and return to the image with which the corresponding geo-tag is associated (e.g., image 337 in FIG. 3C).

In particular embodiments, while an image object is presented in the on-page mode where the image is included in another UI component (e.g., a web page, a page of a digital book), sometimes, the display area for the image is smaller than the size of the image. To fit the image in the available display area, in particular embodiments, a portion or a cropped version of the original image may be displayed. There may be different ways to crop an image, depending on, for example, the dimension or size of the image, the position of the image in the other UI component containing the image, or the size of the display area for the image.

Figure 6A:
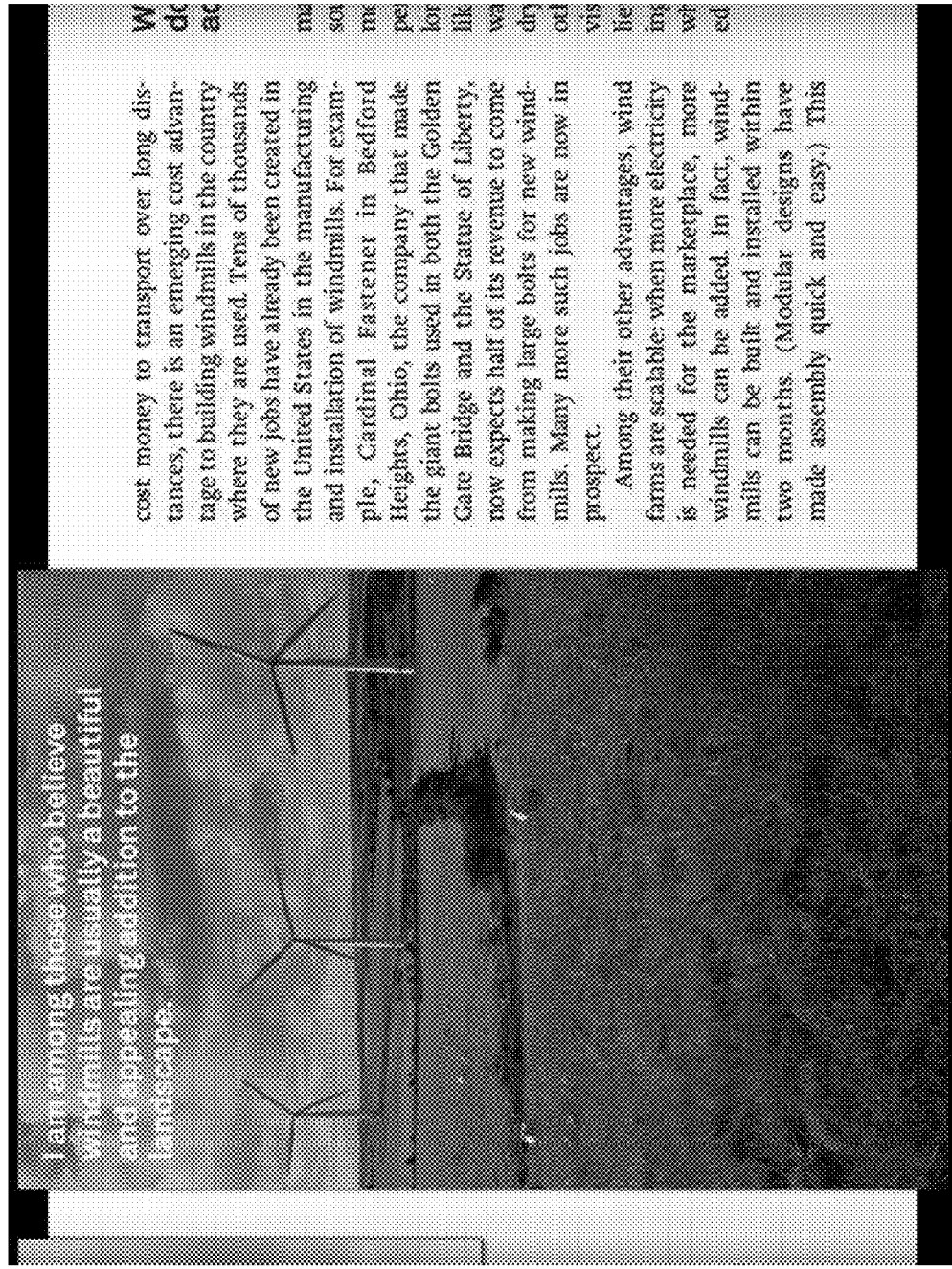
FIGS. 6A-6G illustrate example user manipulations of folded images.

As an example, when an image is presented in the left or right half of a page, the image may be folded in half vertically. FIG. 6A illustrates an image 611 included in a page 610. Image 611 is placed in the left half of page 610 and is folded in half vertically. As another example, when an image is presented in the top or bottom half of a page, the image may be folded in half horizontally. FIG. 6D illustrates an image 621 included in a page 620. Image 621 is placed in the top half of page 620 and is folded in half horizontally. Both images 611 and 621 are presented in the on-page mode, being included in pages 610 and 620 respectively.

As illustrated in FIG. 6A, image 611 floats on top of page 610, since the top and bottom edges of image 611 extend beyond the boundary of page 610. Similarly, as illustrated in FIG. 6D, image 621 floats on top of page 620, since the top edge of image 621 extends beyond the boundary of page 620. In particular embodiments, when a first UI component (e.g., image, video, text box, URL, caption, etc.) floats on top of a second UI component (e.g., page) that contains the first UI component, it is a visual indication that the first UI component may be manipulated by the user in various manners.

Figure 6B:
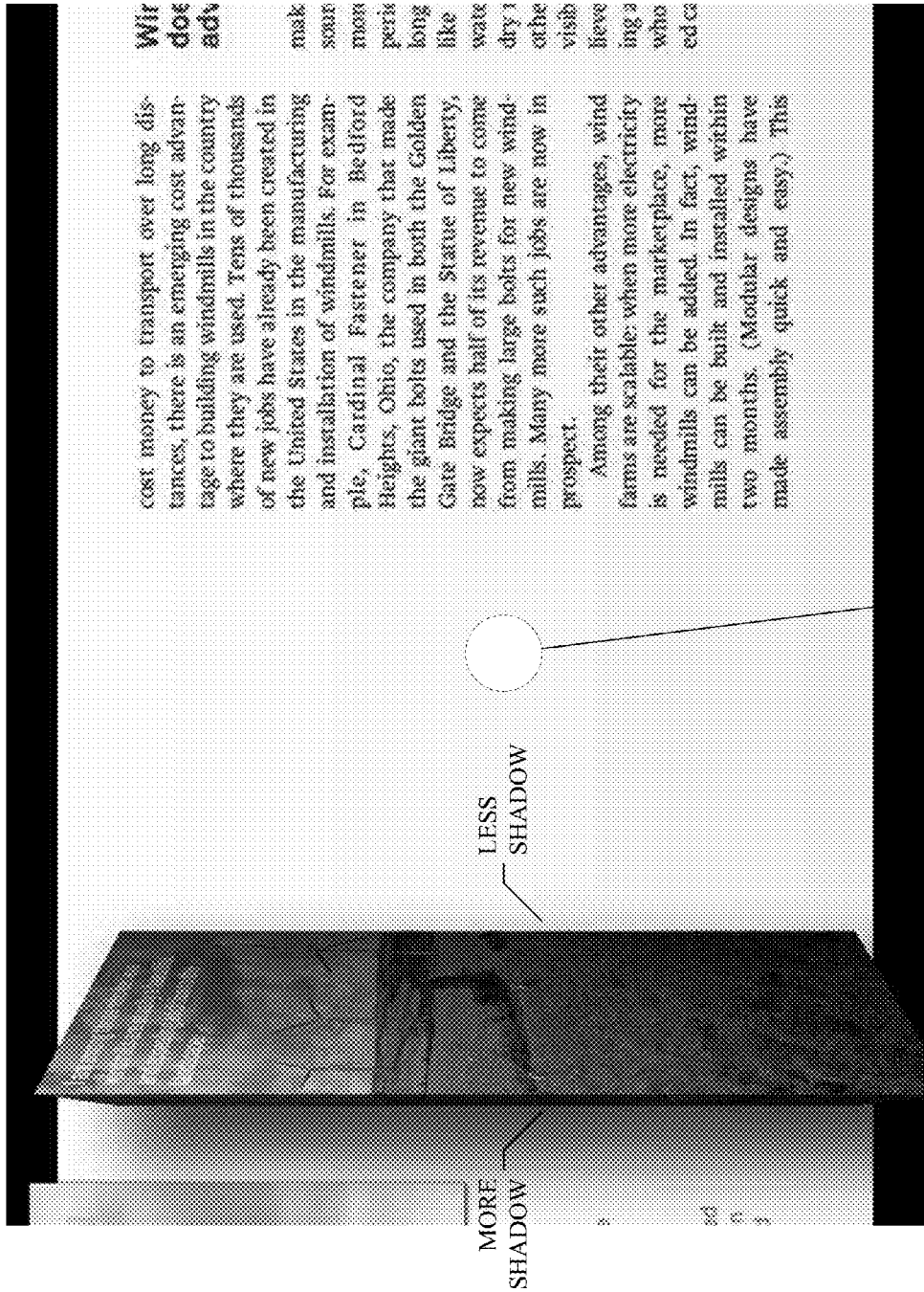
Figure 6C:
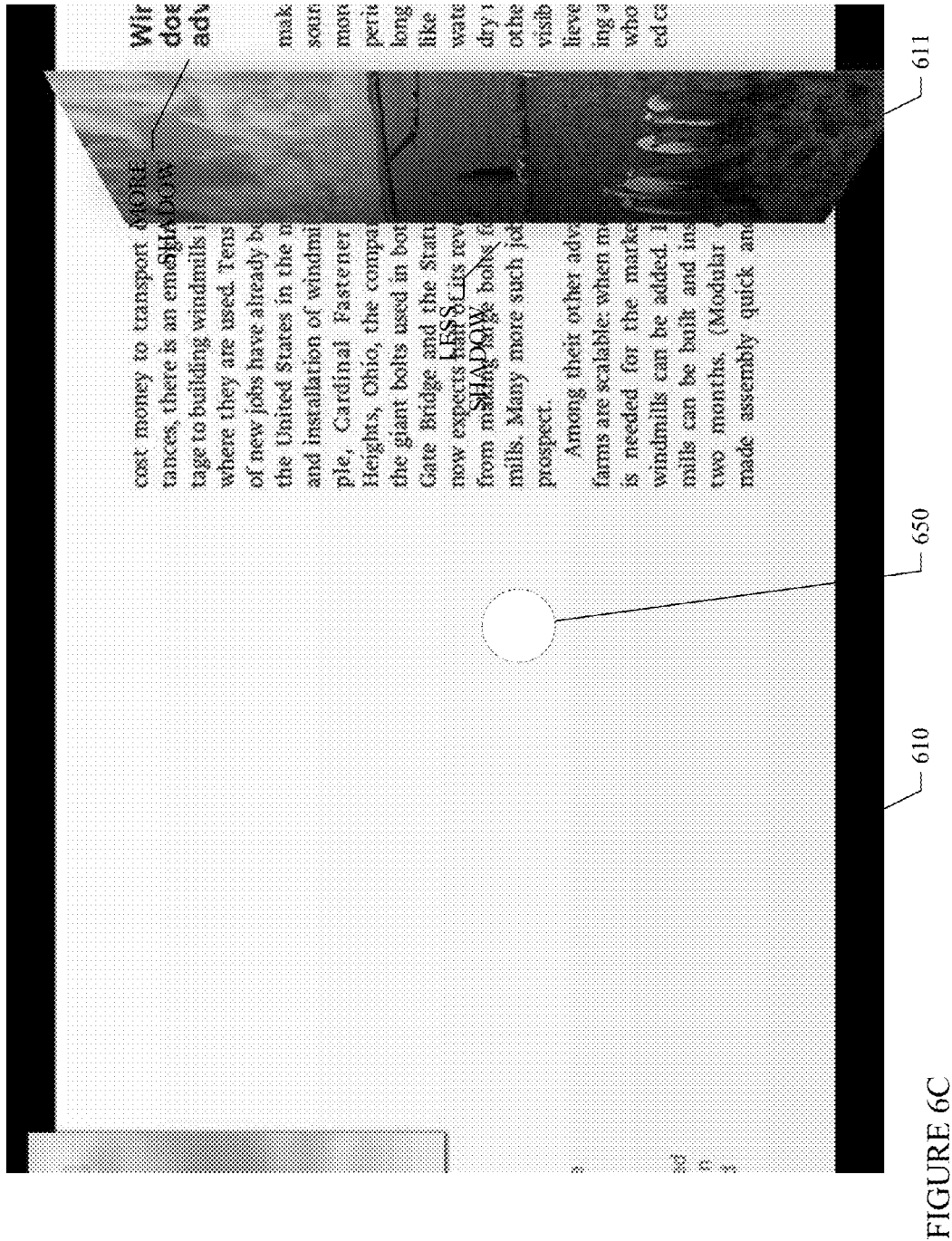
Figure 6D:
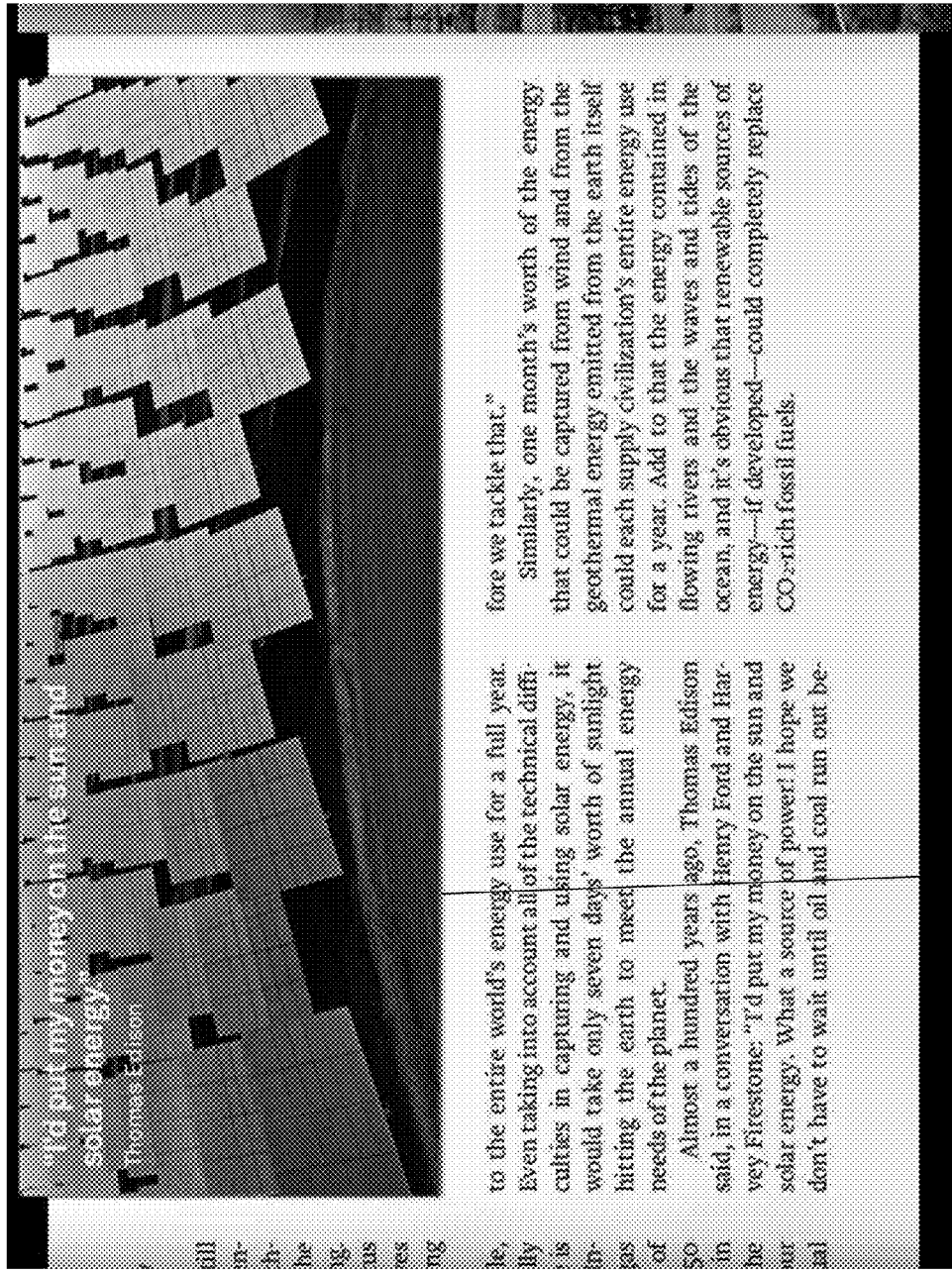
Figure 6E:
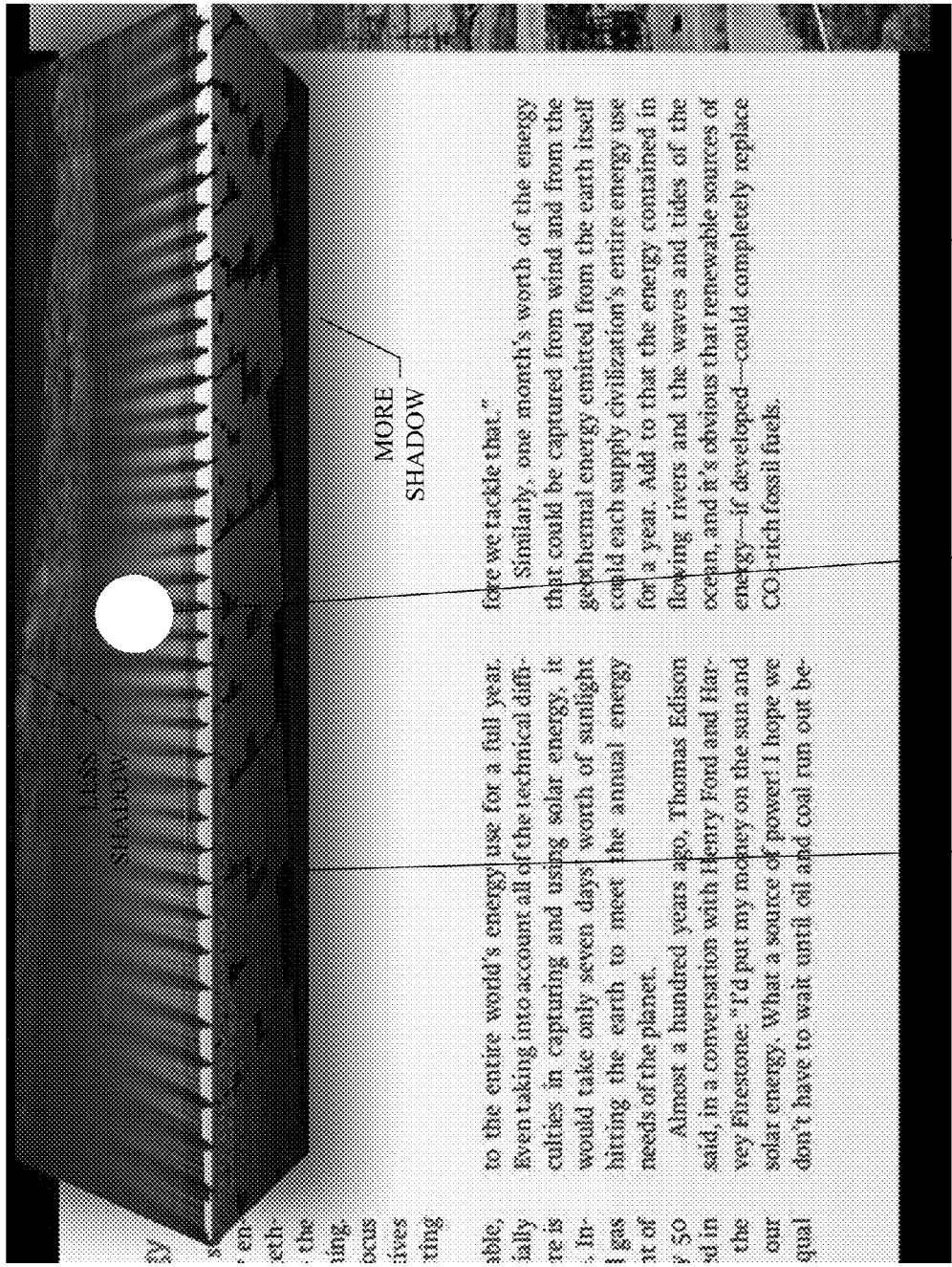
Figure 6F:
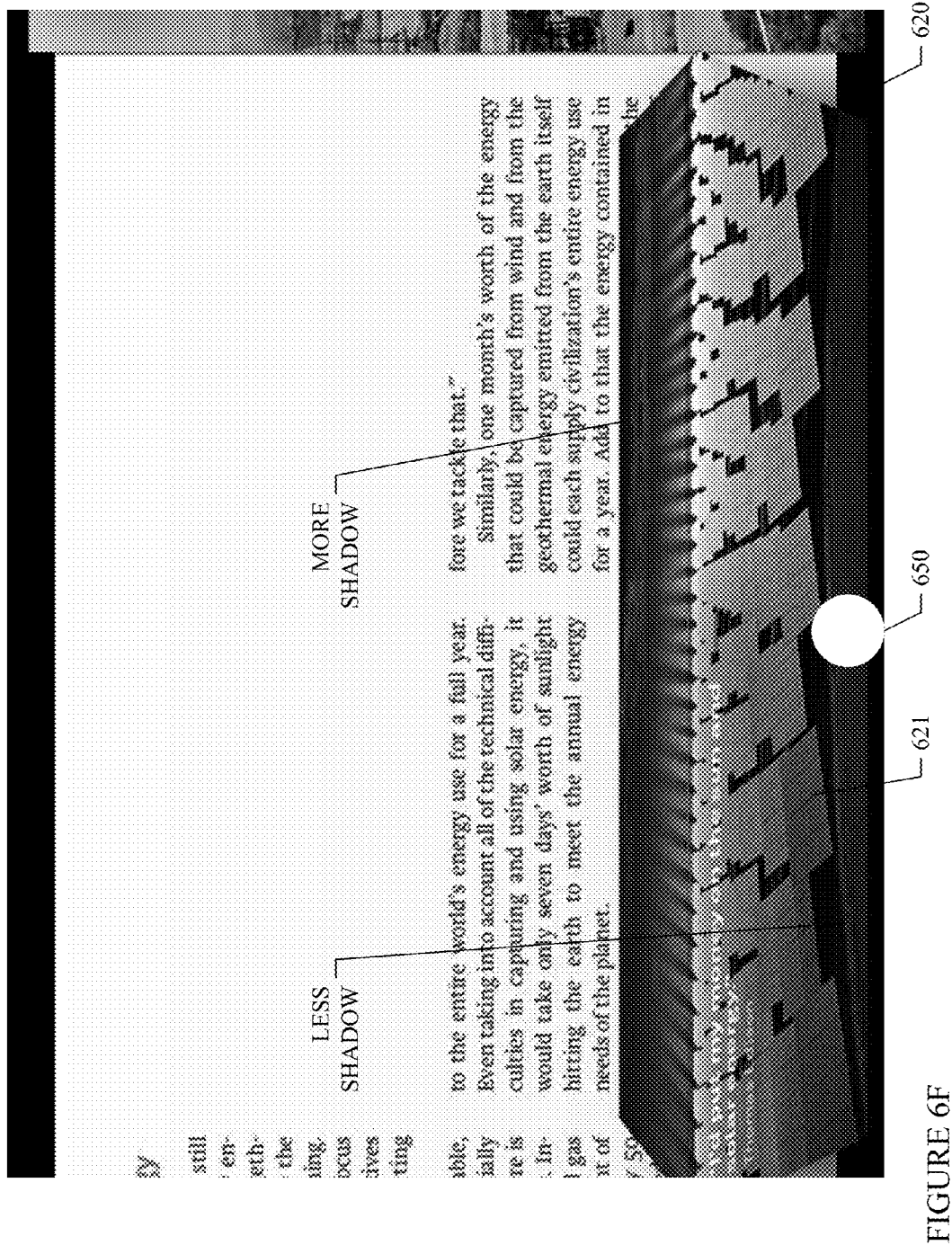
Figure 6G:
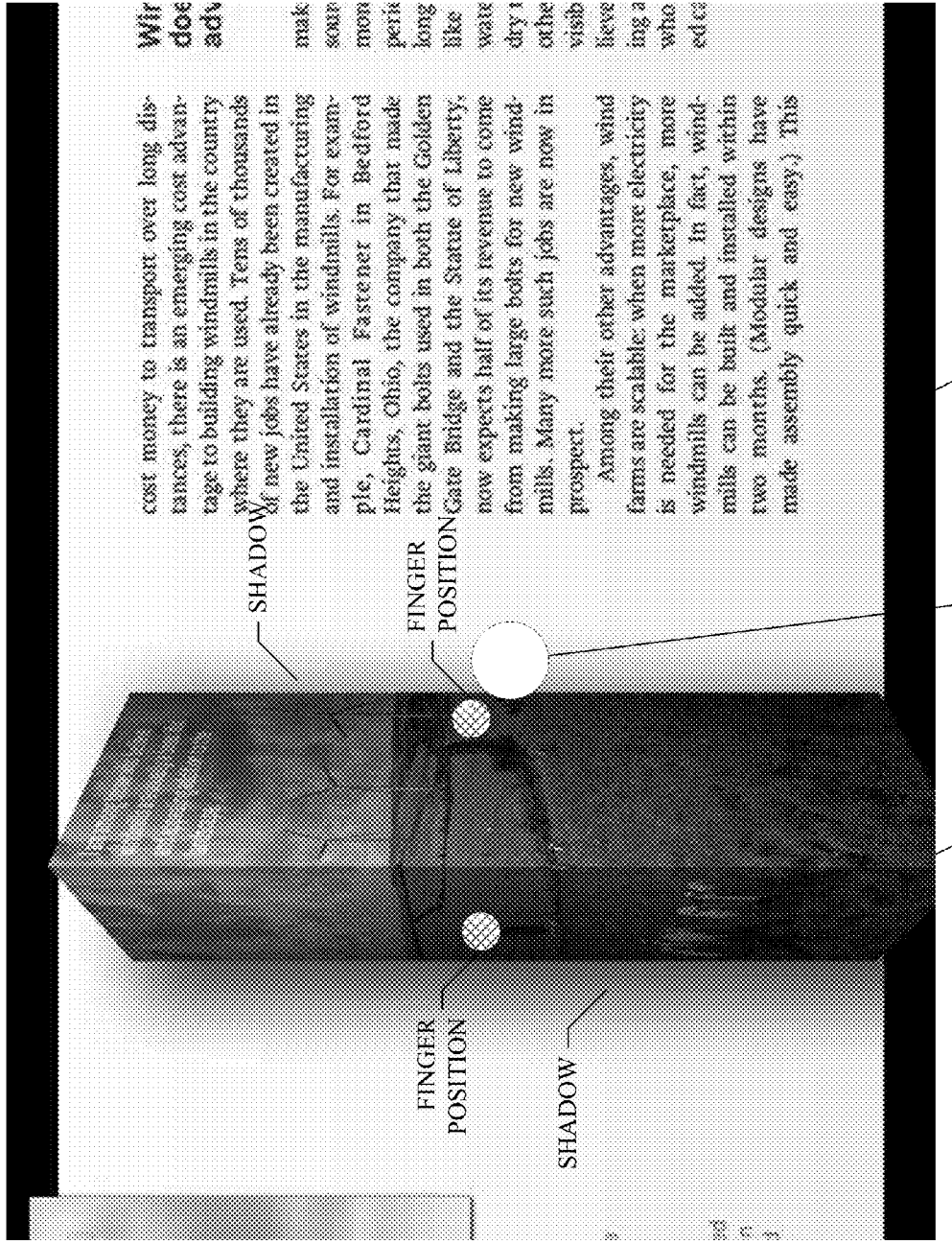

In particular embodiments, when an image floats on top of a page, such as in the case of image 611 floating on top of page 610 as illustrated in FIG. 6A or image 621 floating on top of page 620 as illustrated in FIG. 6D, a user may "lift" the image up and off the page by pinching the image with two fingers through a touch-sensitive screen, as illustrated in FIG. 6G. The two fingers may be placed anywhere near one or more edges of the image. With a folded image, when the image is pinched up and lifted off the page, the entire image appears, but remains folded at an angle relative to the distance between the two fingers the user uses to pinch the image. If the user pinches out beyond a predetermined or specified threshold distance (e.g., by moving the two fingers apart) and then takes his fingers off the image (e.g., by lifting the fingers off the touch-sensitive screen), the image may transition to the full-screen mode and expand to fill the entire screen. For the example illustrated in FIG. 6G, image 611 has been lifted off page 610 when a user places two fingers near the left and right edges of image 611 and pinches image 611 up. Image 611 remains folded vertically, but both left and right sides of image 611 are visible. A horizontally folded image may be lifted off a page similarly.

In particular embodiments, once the user has pinched up an image, the user may drag the image to various positions on the screen or rotate the image by moving the fingers pinching the image appropriately.

In particular embodiments, to simulate the effect of a two-dimensional object (e.g., image) in a three-dimensional virtual space, shadow may be placed around the object. In particular embodiments, a light source may be simulated to cause the effect of shadowing around a floating object (e.g., a floating image). The simulated light source may be placed at any position on or off the screen. In the case illustrated in FIG. 6G, a simulated light source 650 is placed in the center of the display screen (e.g., the center of page 610). The shadow around folded image 611 may change depending on the position of image 611 in relation to simulated light source 650. In addition, in particular embodiments, when simulating the effect of viewing an object in the three-dimensional virtual space, the object may be rotated or rolled (e.g., left or right, up or down) as needed or as appropriate to compensate for perspective.

For example, in FIG. 6B, image 611 has been pinched up and moved toward the left side of the screen (e.g., near the left edge of page 610). In this case, there is more, darker shadow on the left side of image 611 and less, lighter shadow on the right side of image 611, as the left side of image 611 faces away from simulated light source 650 and the right side of image 611 faces toward simulated light source 650. In addition, to compensate for perspective, image 611 is rotated more toward the left so that there is more of the right half of image 611 shown but less of the left half of image 611 shown. In contrast, in FIG. 6C, image 611 has been pinched up and moved toward the right side of the screen (e.g., near the right edge of page 610). In this case, there is more, darker shadow on the right side of image 611 and less, lighter shadow on the left side of image 611, as the right side of image 611 faces away from simulated light source 650 and the left side of image 611 faces toward simulated light source 650. In addition, to compensate for perspective, image 611 is rotated more toward the right so that there is more of the left half of image 611 shown but less of the right half of image 611 shown. In particular embodiments, when a floating object (e.g., floating image 611) is manipulated when in the on-page mode, other objects, such as page or text objects, layered below the floating image remain stationary, permitting the user to manipulate the floating image and read the entire text simultaneously.

Similar shadowing effect may be applied to a floating image when the image is pinched up and moved toward the top or bottom of the screen. For example, in FIG. 6E, image 621 has been pinched up (e.g., by placing two fingers near the top and bottom edges of image 621) and moved toward the top side of the screen (e.g., near the top edge of page 620). Image 621 remains folded horizontally but both the top and bottom sides of image 621 are visible. In this case, to compensate for perspective, image 621 is rotated more toward the bottom so that more of the top half of image 621 is shown. Simulated light source 650 is now placed near the top of or above the screen so that there is more shadow on the bottom side of image 621 than on the top side of image 621, since the top side of image 621 faces toward simulated light source 650 and the bottom side of image 621 faces away from simulated light source 650. In contrast, in FIG. 6F, image 621 has been brought near the bottom of the screen. At this position, to compensate for perspective, image 621 is rotated more toward the top so that more of the bottom half of image 621 is shown. Simulated light source 650 is now placed near the bottom of or below the screen so that there is more shadow on the top side of image 621 than on the bottom side of image 621, since the top side of image 621 faces away from simulated light source 650 and the bottom side of image 621 faces toward simulated light source 650.

Figure 7:
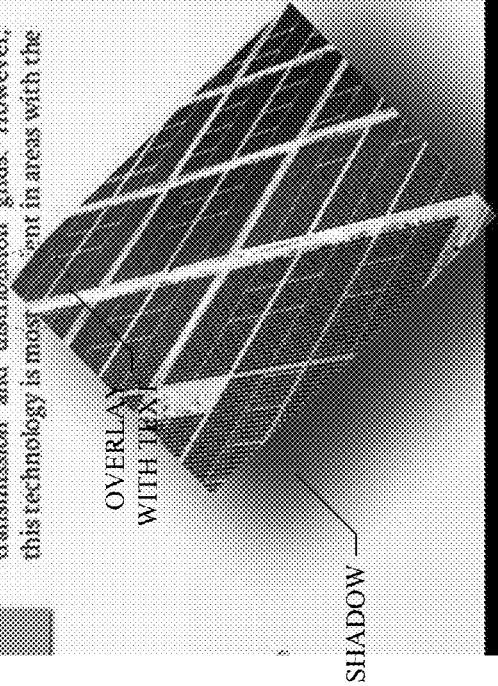
FIG. 7 illustrates rotating a floating image.

When a floating object (e.g., a floating image) is pinched up, it may be moved to different positions on the screen, as illustrated in FIGS. 6B, 6C, 6E, 6F. In particular embodiments, it may also be rotated, as illustrated in FIG. 7. In this example, an image 711 contained in a page 710 has been pinched up (e.g., using two fingers) and rotated (e.g., by rotating the fingers pinching image 711). The shadow around image 711 may rotate with image 711 accordingly to maintain the three-dimensional effect. In addition, as illustrated in FIG. 7, a portion of image 711 overlays the text beneath it on page 710. In particular embodiments, when a floating object (e.g., image or video) overlays another object (e.g., text) beneath it, the appearance of the object under the floating object may be adjusted (e.g., slightly darkened or distorted) to simulate the effect of the shadow casted by the floating object on the underlaying object.

In particular embodiments, the shadow of an object (e.g., an image) may be implemented as a separate layer. For example, in FIG. 7, image 711 partially overlaps some text on page 710. There is shadow surrounding image 711. The text covered by the shadow may be darkened accordingly as well. In some implementations, the shadow around an object (e.g., an image) may be drawn as a blurry dot, sliced up horizontally and vertically, and then stretched up to fill the necessary shadow area. This allows the shadow of an object to be determined without performing ray tracing, which is very computationally intensive and thus resource demanding.

In particular embodiments, when a user pinches or picks up an image with two fingers (e.g., through a touch-sensitive screen), as long as the user's fingers are in contact with the image (e.g., by staying in contact with the touch-sensitive screen), the image may move according to the movements of the user's fingers. In other words, there may be an one-to-one corresponding interaction between the movements of the user's fingers and the movements of the image. As an example, when a folded image is picked up (e.g., pinched up with two fingers), if the user's fingers move apart, the image may unfold more so that the two edges pinched by the user's fingers move further apart or the image may increase in size. If the user's fingers move closer, the image may fold more so that the two edges pinched by the user's fingers move closer or the image may decrease in size. As another example, when an un-folded image is picked up (e.g., pinched up with two fingers), its size may change with the movements of the two fingers. By moving the two fingers further apart, the image may be enlarged. Conversely, by moving the two fingers closer together, the size of the image may be decreased. As a third example, if the user's fingers move to different positions on the screen, the image may follow and move with the user's fingers to different positions on the screen and may rotate appropriately to simulate the effect of viewing the image in a three-dimensional virtual space (e.g., to compensate for perspective). The shadow around the image may move with the image (e.g., as the image fold or unfold, increase or decrease in size, rotate, pan, etc.).

In particular embodiments, the animation of the image's movements may give the perception that the user is holding the image at the same two points on the image where the user's fingers are in contact with the image throughout the movements. The locations of the user's fingers may be projected into the three-dimensional virtual space.

In particular embodiments, when an image is picked up, the animation of its movements following the user's fingers may be based on spring motions. For example, how much should the image fold or unfold, how much should the image rotate, or how much should the image bounce against the edge of the screen, as the user's fingers move may be determined based on spring motions. In particular embodiments, an image's movements may be simulated by, supposedly, attaching the image to an imaginary spring. When the user's fingers pick up the image, the supposed force the user's fingers exert on the image may cause the image to have supposed mass. When an object with mass (e.g., an image with supposed mass) is attached to a spring, its movements may follow specific physical properties. In addition to the mass, the spring may have properties such as, for example and without limitation, tension, stretch, and dampening. By selecting various values for these properties, different movements of the image may be simulated.

In particular embodiments, to simulate the effect of picking up an object (e.g., image, video) in the three-dimensional virtual space, when a first object is picked up, a second object beneath the first object may be moved backward in the virtual three-dimensional space. For example, when image 711 is pinched up, page 710, together with the text on it, may be moved backward to create the visual effect of a greater distance between image 711 and page 710, which in turn simulates the effect of image 711 being picked up from page 710. The shadow casted by image 711 on page 710 may increase in size accordingly.

Figure 8B:
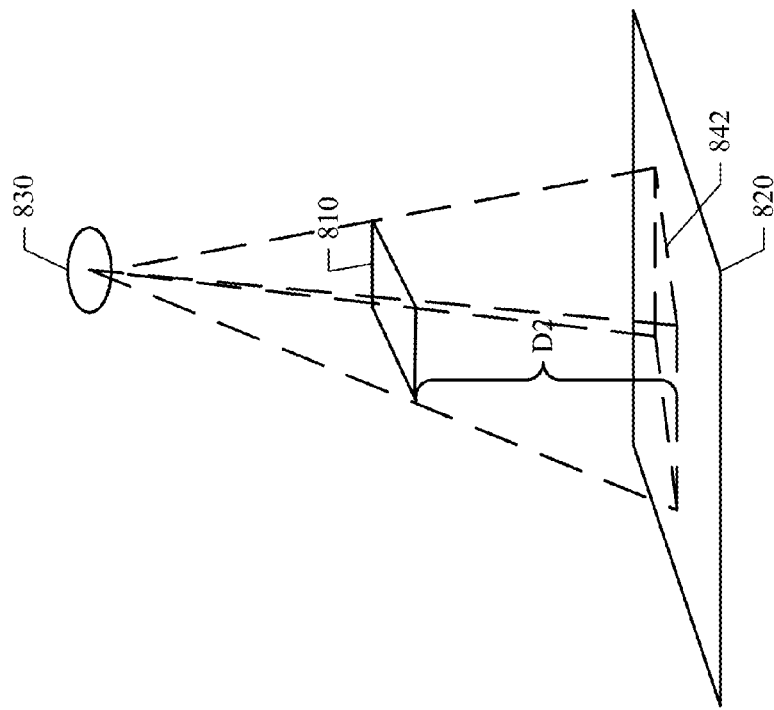
FIGS. 8A-8B illustrate simulating an object being picked up in a three-dimensional virtual space.
Figure 8A:
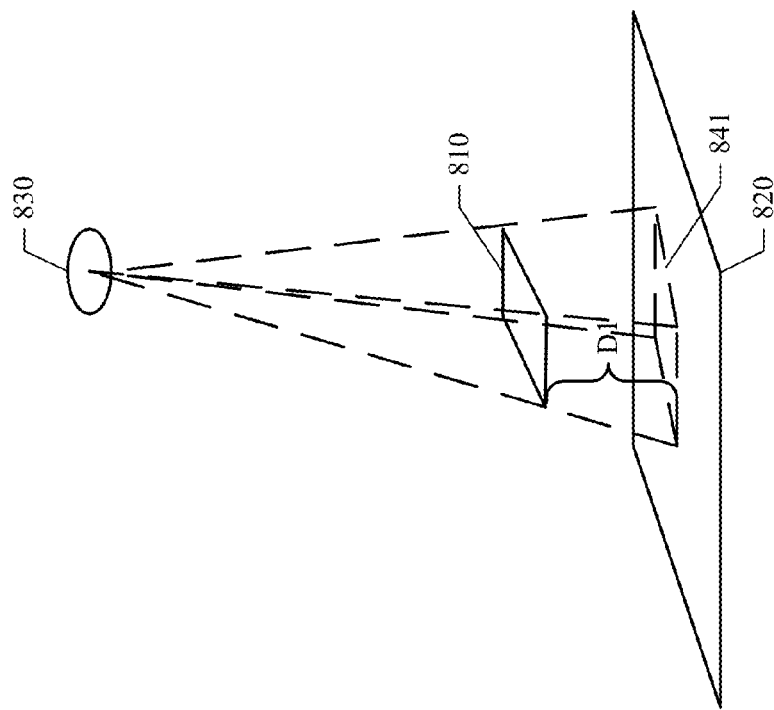

The simulation of the effect of picking up a two-dimensional object in a virtual three-dimensional space is further illustrated in FIG. 8. In FIG. 8A, the distance between objects 810 and 820 is D1. A light source 830 above object 810 causes object 810 to cast a shadow 841 of object 810 onto object 820. In FIG. 8B, object 810 has moved away from object 820 and closer to light source 830. The distance between objects 810 and 820 is D2, which is greater than D1. Light source 830 again causes object 810 to cast a shadow 842 of object 810 onto object 820. But because object 810 is now further away from object 820, shadow 842 is larger than shadow 841. Thus, by changing the size of the shadow a first object casts onto a second object, it may stimulate the effect that the first object is moving away from (e.g., increasing shadow size) or moving closer toward the second object (e.g., decreasing shadow size). In the case of picking up an image from a page, by changing the size of the shadow the image casts onto the page, it may stimulate the effect that the image is moving away from (e.g., increasing shadow size) or moving closer toward the page (e.g., decreasing shadow size). When the image is moving away from the page, it appears that the image is picked up from the page.

User Manipulation of Image or Video Object

In particular embodiments, an image or video object presented in a user interface may be manipulated by a user. FIG. 9 illustrates an example method for a user to manipulate an image or a video presented in a user interface. In particular embodiments, at 910, an image or a video may be presented in a user interface in one of the available presentation modes (e.g., index mode, on-page mode, full-screen mode). At 920, a user may interacts with the image or video. At 930, in response to the user interaction, the image or the video may be modified. How the image or the video is actually modified may depend on the presentation mode it is in or the user interaction. For example, as described above, the user interaction may cause the image or video to transition to a different presentation mode, to move or rotate or pan, to increase or decrease its size, and so on. The steps illustrated in FIG. 9 may be repeated as needed.

Electronic Device

Particular embodiments may be implemented on one or more electronic devices or computer systems. FIG. 10 illustrates an example electronic device 1000. For example, computer system 1000 may be an embodiment for device 110A or device 110B illustrated in FIG. 1. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include an HDD, a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

What is claimed is:

1. A method, performed by one or more first electronic devices, comprising:
   presenting a video in a user interface of a digital book in a first presentation mode of a plurality of presentation modes, each presentation mode of the plurality of presentation modes having a specific size for presenting a visual portion of the video and a specific volume for presenting an audio portion of the video;
   in response to a user interaction to start playback of the video in the first presentation mode, automatically transitioning the video to a second presentation mode, comprising:
      changing the visual portion of the video from a first size of the first presentation mode to a second size of the second presentation mode,
         the first size being different from the second size,
         the first presentation mode being a same playback status as the second presentation mode, and
         the second presentation mode being different from the first presentation mode, the second presentation mode being a full-screen mode in which the video is expanded to cover an entire screen of the device; and
      changing the audio portion of the video from a first volume of the first presentation mode to a second volume of the second presentation mode, the first volume being different from the second volume; and
   upon an end of the playback of the video, automatically transitioning the video from the second presentation mode back to the first presentation mode,
   wherein when the second size of the second presentation mode is larger than the first size of the first presentation mode, the second volume is automatically adjusted to be higher than the first volume, and wherein when the second size of the second presentation mode is smaller than the first size of the first presentation mode, the second volume is automatically adjusted to be lower than the first volume.

2. The method of claim 1, wherein the plurality of presentation modes comprises an index mode, an on-page mode, and a full-screen mode.

3. The method of claim 2, further comprising:
while presenting the video in the index mode, in response to a user single tapping or pinching open the video, transitioning the video from the index mode to the on-page mode;
while presenting the video in the on-page mode, in response to the user single tapping or pinching open the video, transitioning the video from the on-page mode to the full-screen mode;
while presenting the video in the full-screen mode, in response to the user double tapping or pinching close the video, transitioning the video from the full-screen mode to the on-page mode; and
while presenting the video in the on-page mode, in response to the user double tapping or pinching close the video, transitioning the video from the on-page mode to the index mode.

4. The method of claim 2, further comprising:
while presenting the video in the on-page mode, in response to a user navigating away from a user-interface component including the video,
recording a current playback position of the video; and
gradually fading away the audio portion of the video; and
while presenting the video in the on-page mode, in response to the user navigating to the user-interface component including the video, resuming playback of the video at the recorded playback position of the video.

5. The method of claim 2, further comprising
while presenting the video in the on-page mode, visually indicating that the video is user interactive by floating the video on top of a user-interface component including the video.

6. The method of claim 1, further comprising
while presenting the video in each presentation mode, associating a playback control icon with the video.

7. One or more computer-readable non-transitory storage media embodying software that is operable when executed to:
present a video in a user interface of a digital book in a first presentation mode of a plurality of presentation modes, each presentation mode of the plurality of presentation modes having a specific size for presenting a visual portion of the video and a specific volume for presenting an audio portion of the video;
in response to a user interaction to start playback of the video in the first presentation mode, automatically transitioning the video to a second presentation mode, comprising:
change the visual portion of the video from a first size of the first presentation mode to a second size of the second presentation mode,
the first size being different from the second size,
the first presentation mode being a same playback status as the second presentation mode and
the second presentation mode being different from the first presentation mode, the second presentation mode being a full-screen mode in which the video is expanded to cover an entire screen of the device; and
change the audio portion of the video from a first volume of the first presentation mode to a second volume of the second presentation mode, the first volume being different from the second volume: and
upon an end of the playback of the video, automatically transitioning the video from the second presentation mode back to the first presentation mode,
wherein when the second size of the second presentation mode is larger than the first size of the first presentation mode, the second volume is automatically adjusted to be higher than the first volume, and
wherein when the second size of the second presentation mode is smaller than the first size of the first presentation mode, the second volume is automatically adjusted to be lower than the first volume.

8. The media of claim 7, wherein the plurality of presentation modes comprises an index mode, an on-page mode, and a full-screen mode.

9. The media of claim 8, wherein the software is further operable to:
while presenting the video in the index mode, in response to a user single tapping or pinching open the video, transition the video from the index mode to the on-page mode;
while presenting the video in the on-page mode, in response to the user single tapping or pinching open the video, transition the video from the on-page mode to the full-screen mode;
while presenting the video in the full-screen mode, in response to the user double tapping or pinching close the video, transition the video from the full-screen mode to the on-page mode; and
while presenting the video in the on-page mode, in response to the user double tapping or pinching close the video, transition the video from the on-page mode to the index mode.

10. The media of claim 8, wherein the software is further operable to:
while presenting the video in the on-page mode, in response to a user navigating away from a user-interface component including the video,
record a current playback position of the video; and
gradually fade away the audio portion of the video; and
while presenting the video in the on-page mode, in response to the user navigating to the user-interface component including the video, resume playback of the video at the recorded playback position of the video.

11. The media of claim 8, wherein the software is further operable to
while presenting the video in the on-page mode, visually indicate that the video is user interactive by floating the video on top of a user-interface component including the video.

12. The media of claim 7, wherein the software is further operable to
while presenting the video in each presentation mode, associate a playback control icon with the video.

13. A system comprising:
a memory comprising instructions executable by one or more processors; and
the one or more processors coupled to the memory and operable to execute the instructions, the one or more processors being operable when executing the instructions to:

present a video in a user interface of a digital book in a first presentation mode of a plurality of presentation modes, each presentation mode of the plurality of presentation modes having a specific size for presenting a visual portion of the video and a specific volume for presenting an audio portion of the video;

in response to a user interaction to start playback of the video in the first presentation mode, automatically transitioning the video to a second presentation mode, comprising:

change the visual portion of the video from a first size of the first presentation mode to a second size of the second presentation mode, the first size being different from the second size, the first presentation mode being a same playback status as the second presentation mode and the second presentation mode being different from the first presentation mode, the second presentation mode being a full-screen mode in which the video is expanded to cover an entire screen of the device; and change the audio portion of the video from a first volume of the first presentation mode to a second volume of the second presentation mode, the first volume being different from the second volume; and upon an end of the playback of the video, automatically transitioning the video from the second presentation mode back to the first presentation mode, wherein when the second size of the second presentation mode is larger than the first size of the first presentation mode, the second volume is automatically adjusted to be higher than the first volume, and wherein when the second size of the second presentation mode is smaller than the first size of the first presentation mode, the second volume is automatically adjusted to be lower than the first volume.

14. The system of claim 13, wherein the plurality of presentation modes comprises an index mode, an on-page mode, and a full-screen mode.

15. The system of claim 14, the processors are further operable when executing the instructions to:

while presenting the video in the index mode, in response to a user single tapping or pinching open the video, transition the video from the index mode to the on-page mode;

while presenting the video in the on-page mode, in response to the user single tapping or pinching open the video, transition the video from the on-page mode to the full-screen mode;

while presenting the video in the full-screen mode, in response to the user double tapping or pinching close the video, transition the video from the full-screen mode to the on-page mode; and while presenting the video in the on-page mode, in response to the user double tapping or pinching close the video, transition the video from the on-page mode to the index mode.

16. The system of claim 14, the processors are further operable when executing the instructions to:

while presenting the video in the on-page mode, in response to a user navigating away from a user-interface component including the video, record a current playback position of the video; and gradually fade away the audio portion of the video; and while presenting the video in the on-page mode, in response to the user navigating to the user-interface component including the video, resume playback of the video at the recorded playback position of the video.

17. The system of claim 14, the processors are further operable when executing the instructions to while presenting the video in the on-page mode, visually indicate that the video is user interactive by floating the video on top of a user-interface component including the video.

\* \* \* \* \*